(12) United States Patent
Seo et al.

(10) Patent No.: US 7,656,947 B2
(45) Date of Patent: Feb. 2, 2010

(54) SYNCHRONIZATION DEVICE AND SYNCHRONIZATION METHOD IN DIGITAL BROADCAST RECEIVER

(75) Inventors: Jeong-Wook Seo, Daegu (KR); Young-Chel Ku, Gumi-si (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 11/545,558

(22) Filed: Oct. 11, 2006

(65) Prior Publication Data

US 2007/0081563 A1  Apr. 12, 2007

(30) Foreign Application Priority Data

Oct. 11, 2005  (KR) ..................... 10-2005-0095534

(51) Int. Cl.
   *H04B 1/66* (2006.01)
(52) U.S. Cl. .................. 375/240; 375/240.25; 370/503; 370/542
(58) Field of Classification Search .................... 352/12; 370/542, 916
   See application file for complete search history.

(56) References Cited

U.S. PATENT DOCUMENTS

| | | | | |
|---|---|---|---|---|
| 6,151,441 A | * | 11/2000 | Kawamura et al. | 386/95 |
| 6,163,647 A | * | 12/2000 | Terashima et al. | 386/96 |
| 6,377,588 B1 | * | 4/2002 | Osaki | 370/508 |
| 6,567,427 B1 | * | 5/2003 | Suzuki et al. | 370/535 |
| 2004/0022525 A1 | * | 2/2004 | Yamashita | 386/111 |

* cited by examiner

*Primary Examiner*—Jinhee J Lee
*Assistant Examiner*—James P Duffy
(74) *Attorney, Agent, or Firm*—Roylance, Abrams, Berdo & Goodman, LLP.

(57) ABSTRACT

A decoding device and a decoding method in a digital broadcast receiver are provided, in which received packet data is demultiplexed into video data and audio data, and decoding control signals of the respective data are extracted. An Estimated Program Clock Reference (EPCR) is generated from the decoding control signal of the audio data, and the EPCR is compared with the decoding control signal of the video data to generate a video decoding control signal. The demultiplexed video data is decoded in synchronous with the video decoding control signal, and then the decoded video data is outputted. The demultiplexed audio data is decoded in synchronous with the audio decoding control signal, and then the decoded audio data is outputted. Finally, the decoded video data and the decoded audio data are displayed and reproduced.

10 Claims, 45 Drawing Sheets

FIG.11D

Optional Field 1:

| PCR | OPCR | Splice Countdown | Transport Private Data Length | Transport Private Data | Adaptation Field Extension Length | 3 Flags | Optional Field 2 |
|---|---|---|---|---|---|---|---|
| 42 | 42 | 8 | 8 | - | 8 | 3 | - |

FIG.11E

PES Header:

| '10' | PES Scrambling Control | PES Priority | Data Alignment Indicator | Copyright | Original or Copy | 7 Flags | PES Header Data Length | PES Optional Field 1 | Stuffing Bytes (0xFF) |
|---|---|---|---|---|---|---|---|---|---|
| 2 | 2 | 1 | 1 | 1 | 1 | 8 | 8 | - | - |

FIG.11F

PES Optional Field 1:

| PTS/DTS | ESCR | ES Rate | DSM Track Mode | Additional Copy Info | Previous PES CRC | PES Extension |
|---|---|---|---|---|---|---|

SYNCHRONIZATION DEVICE AND SYNCHRONIZATION METHOD IN DIGITAL BROADCAST RECEIVER

CROSS-REFERENCE TO RELATED PATENT APPLICATIONS

This application claims the benefit under 35 U.S.C. § 119(a) of a Korean Patent Application filed in the Korean Intellectual Property Office on Oct. 11, 2005, and assigned Ser. No. 2005-95534, the entire disclosure of which is hereby incorporated by reference.

BACKGROUND OF THE INVENTION

1. Field of the Invention:

The present invention relates to a synchronization device and a synchronization method in a digital broadcast receiver. More particularly, the present invention relates to a device and a method capable of synchronizing decoding timing of a digital broadcast receiver.

2. Description of the Related Art:

In general, a digital broadcast receiver refers to a device for receiving and displaying a broadcast signal transmitted from a digital broadcast center. Standardization for digital broadcasting is now actively being discussed throughout the world. Digital broadcasting is largely divided into a Digital Multimedia Broadcasting (DMB) scheme in the USA and a Digital Video Broadcasting (DVB) scheme in Europe. In such digital broadcast systems, a digital broadcast center is provided with an encoder, a modulator and a transmitter for digital broadcasting transmission, and a digital broadcast receiver is provided with a tuner, a demodulator and a decoder for digital broadcasting reception.

A portable terminal with a built-in digital broadcast receiver is also being developed. Such a portable terminal with a digital broadcasting reception function must be able to process data received from respective units of the digital broadcast receiver to reproduce an image. At this time, it is preferred that a structure for performing a multimedia function of the portable terminal is constructed as compact as possible and its power consumption is small. Since a user carrying the portable terminal is mobile, the size of the portable terminal is advantageously if it is as small as possible. Therefore, research is vigorously being pursued to develop a portable terminal with a multimedia function, which has small volume and yet satisfactorily performs the corresponding multimedia function.

FIG. 1 is a bock diagram for explaining clock systems of a transmitting side for encoding and transmitting a broadcast signal and a receiving side for decoding and displaying the encoded broadcast signal in a digital broadcast system. The following description will be given on the assumption that a broadcast signal standard is Moving Picture Experts group 2 (MPEG2). However, the same principle can be applied to digital broadcasting standards other than MPEG2, such as MPEG4, H.264 and the like.

Referring to FIG. 1, reference numerals 11, 13, 15 and 17 designate a structure on a transmitting side of the digital broadcast system, and reference numerals 21, 23, 25, 27 and 29 designate a structure on a receiving side of the digital broadcast system. First, the transmitting side's operation will be described. A clock generated in a clock generator 11 is applied to an encoder 17, the encoder 17 encodes an image, and audio and data by using the clock are outputted from the clock generator 11. The transmitting side transmits transmitting side-clock information to the receiving side. A counter 13, which audio and data are inputted from the clock generator 11, counts the clock by a predetermined division ratio, stores the counted clock as a Program Clock Reference (hereinafter referred to as "PCR") in a register 15, and then transmits the PCR to the receiving side.

Next, the receiving side's operation will be described. The receiving side stores a PCR sample in a register 27 before decoding a broadcast signal transmitted from the transmitting side. A clock generator 21 generates a decoding clock for a decoder 29. Accordingly, a clock frequency is similar to the clock generator 11 on the transmitting side, and the division ratio of a counter 23 also has the same value as that of the counter 13 on the transmitting side. A comparator 25 compares a count value outputted from the counter 23 with the PCR value stored in the register 27 on the transmitting side, and controls the clock generator 21 to supply the decoding clock to the decoder 29 when both the values are the same.

The MPEG2 system as described above uses a system clock of 27 MHz, and uses a clock corresponding to 27 MHz/N (N is an integer) during encoding and decoding. The system clock of 27 MHz outputted from the clock generator 11 is applied to the counter 13, and an output of the counter 13 is stored in the register 15 and is transmitted together with other data at an appropriate time over a transmission channel. The decoder 29 extracts PCR information from an adaptation field of each packet to store the PCR information in the PCR register 27. Then, at a point of time when the PCR stored in the register 27 is the same as the PCR received from the transmitting side (that is, at a point of time when the PCR on the receiving side is synchronized with the PCR on the transmitting side), the comparator 25 drives the clock generator 21 to supply the decoding clock to the decoder 29.

In the above-mentioned operations, the MPEG2 system does not transmit the PCR information from packet to packet, but transmits the PCR information at intervals of 100 ms. Usually, the clock generator may makes an error due to temperature, external impacts and product properties, which becomes an error source when the decoder 29 generates an internal system clock based on the PCR information. In other words, there may occur points of time when the receiving side system is not synchronized with a system clock on the transmitting side because the PCR information is transmitted at intervals. The receiving side is the closest to the transmitting side when the PCR information is received, and the error is the greatest just before the PCR information is received.

If the receiving side is loaded with the PCR value, then a 27 MHz clock source of the clock generator 21 begins to increase a local time reference value of the decoder 29. As stated above, the clock generator 21 make an error due to temperature, external impacts and product properties, which is caused by an error in the local time reference value. Thus, the local time reference value of the decoder 29 becomes different from the PCR count value of the encoder 17. However, if the clock frequency is finely corrected by a different component between the PCR value decoded within the transmission interval of 100 ms and the local time reference value, the local time reference value can consequently correspond to the PCR value of the encoder 17. This finely corrected local time reference value is called a LPCR (Local Program Clock Reference). FIG. 2 is a block diagram illustrating a structure for generating an LPCR to be supplied to the decoder 29 on the receiving side, and simultaneously is a view for explaining a method of reproducing a system PCR. The LPCR generation method using the structure as illustrated in FIG. 2 corresponds to a common PCR generation method used in a MPEG decoding system, such as a settop-box.

Referring to FIG. 2, if a received PCR value is applied to the comparator 25, the comparator 25 compares the received PCR value with the LPCR value of the counter 23 to generate an error signal according to a difference between the two input values. The received PCR value is initially different from the LPCR value, so the clock generator 21 finely corrects a generated erroneous clock (27 MHz). Thus, if a certain time elapses, the received PCR value becomes identical to the LPCR value. Through such a procedure, a LPCR for use in the receiving side can be reproduced. Also, when the LPCR value is identical to the PCR value, a divider 31 divides the clock by a predetermined division ratio to apply the divided clocks as audio, video and data decoding clocks to the decoder 29.

The digital broadcast receiver may use two time stamps in order to control the decoder. In the digital broadcast receiver, there are two types of time stamps, that is, a Decoding Timing Stamp (hereinafter referred to as "DTS") and a Presentation Timing Stamp (hereinafter referred to as "PTS"). Here, the DTS has a PCR value at a point of time when the decoder begins to perform decoding, and the PTS has a PCR value at a point of time when a decoding result is outputted from the decoder. Thus, the digital broadcast receiver controls the decoder such that the decoder begins to decode received data when the DTS is generated, and outputs a decoded broadcast signal when the PTS is generated. Accordingly, the digital broadcast receiver may not use the PTS in a case where the DTS is used, or may not use the DTS in a case where the PTS is used.

FIG. 3 is a block diagram for explaining a synchronization procedure of a digital broadcast receiver using a DTS, and FIG. 4 is a timing chart illustrating timing for controlling a decoding operation in a synchronization structure as shown in FIG. 3.

Referring to FIGS. 3 and 4, the digital broadcast receiver begins to perform decoding of audio, video and/or data in coincident with DTS information. That is, the synchronization of a decoder (audio, video and/or data decoder) is implemented by a DTS. First, if a digital broadcast signal is received, a PCR/DTS extractor 41 extracts a PCR and a DTS from the received digital broadcast signal to output a video DTS (hereinafter referred to as "VDTS") and an audio DTS (hereinafter referred to as "ADTS") to a decoder 45, respectively, as indicated by reference numerals 53 and 55 in FIG. 4. Here, the decoder 45 may be an audio and video decoder. Also, a LPCR generator 43 having a structure as shown in FIG. 2 generates a LPCR synchronized with the PCR, as indicated by reference numeral 51 in FIG. 4. Then, the decoder 45 decodes and outputs the digital broadcast signal at a point of time when the DTS becomes identical to the LPCR value. That is, the LPCR value continually increases by an internal counter of the decoder 45, as indicated by reference numeral 51 in FIG. 4. The corresponding decoder decodes and outputs data stored in an input buffer with reference to the DTS information outputted from the PCR/DTS extractor at a point of time when the LPCR value becomes identical to the DTS, as indicated by reference numerals 53 and 55 in FIG. 4. At this time, an outputting time of the decoder 45 is delayed by a decoding time of the decoder 45.

FIG. 5 is a block diagram for explaining a synchronization procedure of a digital broadcast receiver using a PTS, and FIG. 6 is a timing chart illustrating timing for controlling a decoding operation in a synchronization structure as shown in FIG. 5.

Referring to FIGS. 5 and 6, outputs of a video decoder 65 and an audio decoder 69 are synchronized with each other by using a LPCR and a PTS in FIG. 5. That is, a PCR/PTS extractor 61 extracts PCR information and PTS information from a received digital broadcast signal. Here, the PTS information may be APTS and VPTS information. Then, a LPCR generator 63 generates a LPCR from the PCR, as indicated by reference numeral 81 in FIG. 6, and the video decoder 65 and the audio decoder 69 decode encoded video data and encoded audio data from the received digital broadcast signal, respectively. Also, a video output buffer 67 buffers the video data decoded in the video decoder 65, and outputs the buffered video data at a point of time when the LPCR becomes identical to the VPTS, as indicated by reference numeral 83 in FIG. 6. An audio output buffer 71 buffers the audio data decoded in the audio decoder 69, and outputs the buffered audio data at a point of time when the LPCR becomes identical to the APTS, as indicated by reference numeral 85 in FIG. 6.

However, the decoder synchronization method as stated above must include the LPCR generator for generating the LPCR based on the PCR after the PCR is received. That is, the LPCR generator functions to generate the LPCR corresponding to the PCR transmitted from the transmitting side, and the LPCR is used as a PCR for controlling decoding timing of the audio, video and data decoder. Since a clock generator is included inside the LPCR generator, and the clock generator must generate a clock at high frequency, the LPCR generator requires high precision. Also, the above-mentioned decoding synchronization method of the digital broadcast receiver must make use of the LPCR. In this case, a counter capable of maintaining a preset level (for example, in FIG. 2, 90 KHz) must be designed, and such counter design is difficult to be supported by an Operating System (OS) of a portable terminal with the digital broadcast receiver.

As stated above, the DTS and the PTS are generally used as a synchronization signal for controlling decoding timing of the digital broadcast receiver. At this time, the intermittence of an audio signal is more sensitively perceived as compared with a video signal, so the audio signal is continuously reproduced. Thus, a decoding control signal (ADTS or APTS) of the audio signal can be used if the audio signal becomes identical to the PCR value. That is, decoding timing of audio and video can be controlled with reference to the ADTS or APTS. Since the audio signal has the very short necessary time for decoding, the ADTS and the APTS substantially have the same value. Therefore, after a PCR on a receiving side is set by estimating the PCR value from the ADTS or APTS value, audio decoding timing can be controlled using the ADTS or APTS, and video decoding timing can be controlled by synchronizing a VDTS or VPTS with the ADTS or APTS.

Accordingly, there is a need for an improved synchronization device and synchronization method in a digital broadcast receiver that estimates and reproduces a Program Clock Referencing for controlling decoding timing.

SUMMARY OF THE INVENTION

An aspect of exemplary embodiments of the present invention is to address at least the above problems and/or disadvantages and to provide the advantages described below. Accordingly, an aspect of exemplary embodiments of the present invention is to provide a device and a method in a digital broadcast receiver, which can estimate and reproduce a PCR for controlling decoding timing on a receiving side, and then synchronize decoding timing of a received broadcast signal by using the estimated PCR in a digital broadcast receiver.

A further aspect of exemplary embodiments of the present invention is to provide a device and a method in a digital broadcast receiver, which can estimate a PCR on a receiving side by using an audio decoding control signal, and synchronize decoding timing of a received broadcast signal by using the estimated PCR.

A further aspect of exemplary embodiments of the present invention is to provide a device and a method in a digital broadcast receiver, which can estimate a PCR on a receiving side by using an audio decoding control signal, interpolate the estimated PCR at every frame time to generate an estimation PCR, and synchronize a decoding control signal with the estimation PCR to control decoding timing of a received broadcast signal.

A further aspect of exemplary embodiments of the present invention is to provide a device and a method which can estimate a PCR on a receiving side by using an ADTS, and synchronize a received VDTS with the estimated PCR to control a decoding time of a video signal of a received broadcast signal.

A further aspect of exemplary embodiments of the present invention is to provide a device and a method which can estimate a PCR on a receiving side by using an ADTS, and synchronize a VPTS with the estimated PCR to control a decoding time of a video signal of a received broadcast signal.

A further aspect of exemplary embodiments of the present invention is to provide a device and a method which can estimate a PCR on a receiving side by using an APTS, and synchronize a VDTS with the estimated PCR to control a decoding time of a video signal of a received broadcast signal.

A further aspect of exemplary embodiments of the present invention is to provide a device and a method which can estimate a PCR on a receiving side by using an APTS, and synchronize a VPTS with the estimated PCR to control a decoding time of a video signal of a received broadcast signal.

A further aspect of exemplary embodiments of the present invention is to provide a device and a method in a digital broadcast receiver receiving and processing a plurality of channels, which can estimate PCRs on a receiving side according to the respective channels by using ADTSs of respective corresponding channels, and synchronize decoding timings of broadcast signals received over the respective channels by using the estimated PCRs.

In order to accomplish these objects, in accordance with one aspect of exemplary embodiments of the present invention, there is provided a decoding device in a digital broadcast receiver, in which a demultiplexer unit demultiplexes received packet data into video data and audio data, and extracts decoding control signals of the respective data; a synchronization controller unit generates an Estimated Program Reference Clock (EPCR) from the decoding control signal of the audio data, and compares the EPCR with the decoding control signal of the video data to generate a video decoding control signal; a video decoder unit decodes the demultiplexed video data in synchronous with the video decoding control signal, and then outputs the decoded video data; an audio decoder unit decodes the demultiplexed audio data in synchronous with the audio decoding control signal, and then outputs the decoded audio data; and a display unit displays the decoded video data.

In accordance with another aspect of exemplary embodiments of the present invention, there is provided a decoding method in a digital broadcast receiver, in which received packet data is demultiplexed into video data and audio data, and decoding control signals of the respective data are extracted; an EPCR is generated from the decoding control signal of the audio data, and the EPCR is compared with the decoding control signal of the video data to generate a video decoding control signal; the demultiplexed video data in synchronous with the video decoding control signal is decoded, and then the decoded video data is output; the demultiplexed audio data in synchronous with the audio decoding control signal, and then outputting the decoded audio data is decoded; and the decoded video data and the decoded audio data is displayed and reproduced.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIGS. 11a to 11f are views illustrating a header configuration of a received data packet;

Throughout the drawings, the same drawing reference numerals will be understood to refer to the same elements, features and structures

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description, specific details such as an MPEG2-TS data configuration, and the like are illustrated in order to provide more general understanding of exemplary embodiments of the present invention. However, it is apparent to those skilled in the art that the exemplary embodiments of the present invention can also be easily practiced by means of various modifications without such specific details.

Among terms to be used below, a decoding control signal is a term including a DTS (Decoding Time Stamp) and a PTS (Presentation Time Stamp). The DTS will be used as a decoding start control signal, and the PTS will be used as a decoding outputting control signal. Also, a term "decoding timing control" or "decoding time point control" will be used as a term including the meaning of decoding start control of a decoder or outputting control of decoded data.

An Estimated Program reference Clock (hereinafter referred to as "EPCR") will be used as a term meaning a Program Clock Reference (PCR) which is estimated from an audio decoding control signal on a receiving side.

Further, a video decoding processor unit will be used as a term including a video decoder, an input buffer and an output buffer for decoding of video data, and an audio decoding processor unit will be used as a term including an audio decoder, an input buffer and an output buffer for decoding of audio data.

In exemplary embodiments of the present invention, it is assumed that a Transport Stream (TS) signal inputted into the digital broadcast receiver is an MPEG2-TS signal. However, regardless of whether the TS follows a system standard of MPEG-2, whether a video signal included as particular data follows any one of H.261 to H.264 or MPEG-4, and whether an audio signal follows any one rules MPEG-1 to MPEG-4, a decoder control structure according to exemplary embodiments of the present invention can be applied in all the same manner.

Figure 1:
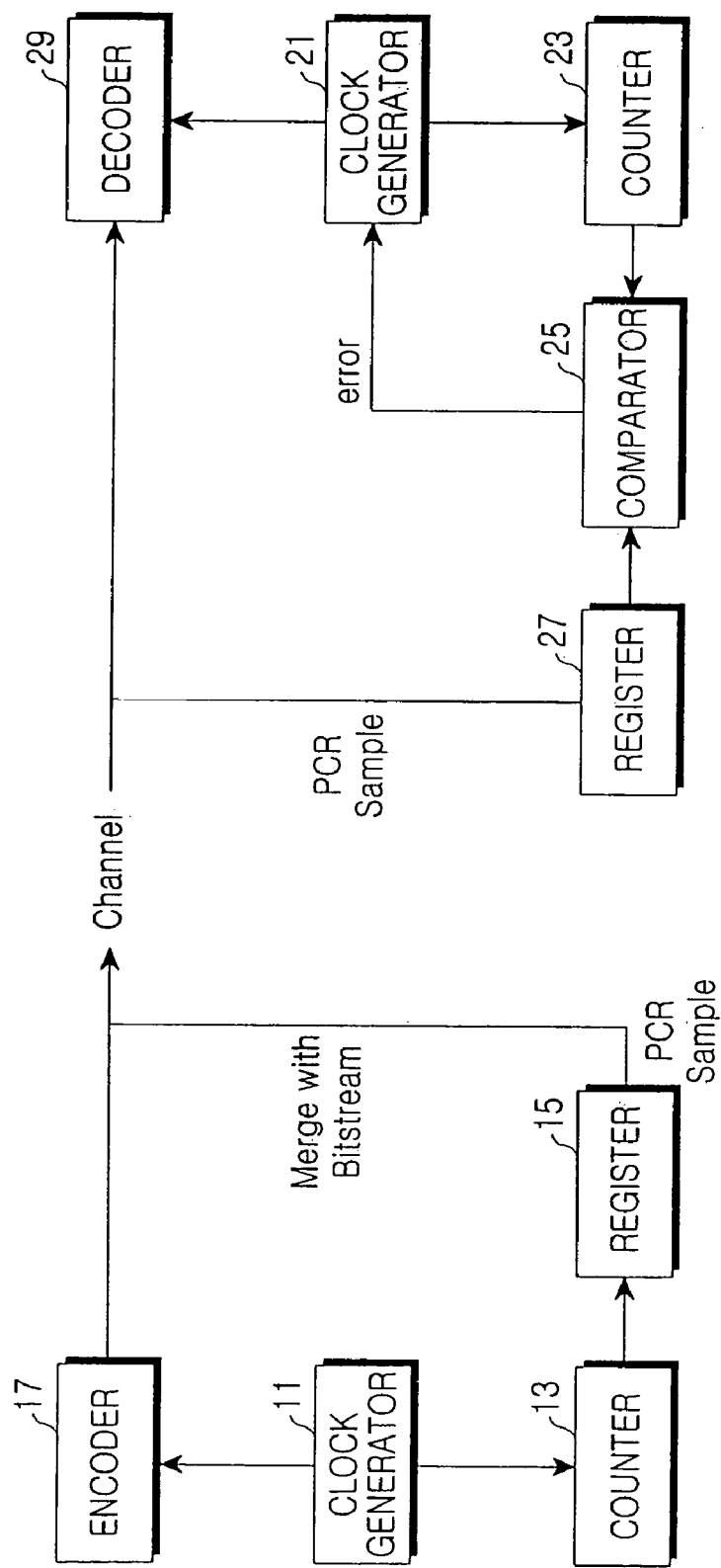
FIG. 1 is a block diagram for explaining a clock synchronization structure of a digital broadcast system.
Figure 2:
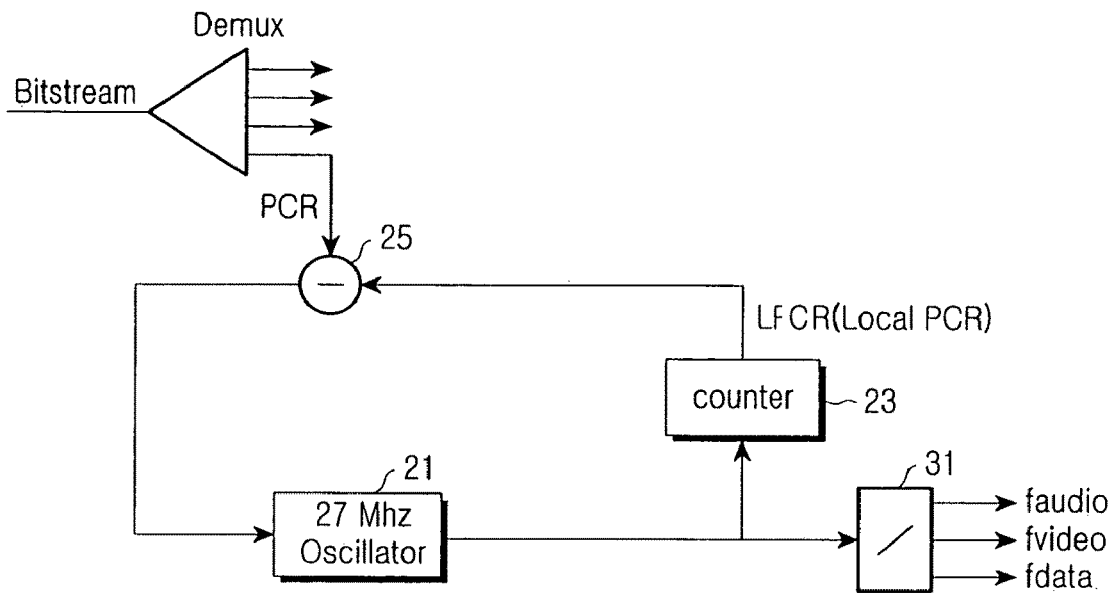
FIG. 2 is a block diagram illustrating a structure of extracting a clock from data received in FIG. 1.
Figure 3:
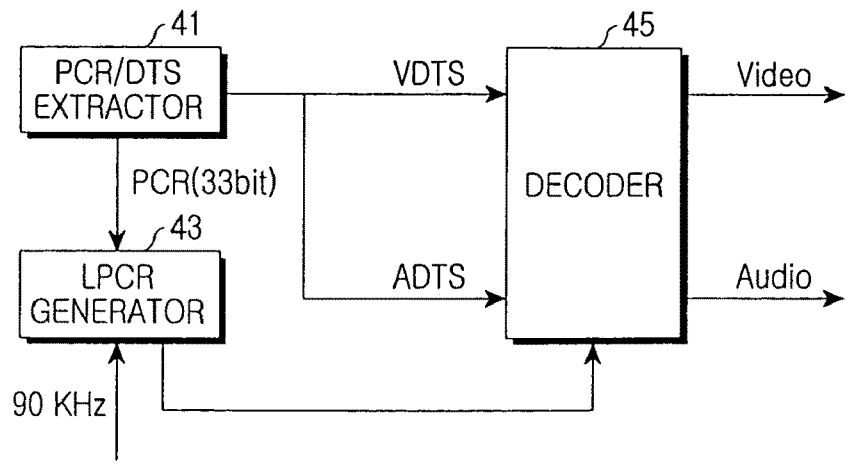
FIG. 3 is a block diagram illustrating a structure of controlling decoding timing of data received in a conventional digital broadcast receiver.
Figure 4:
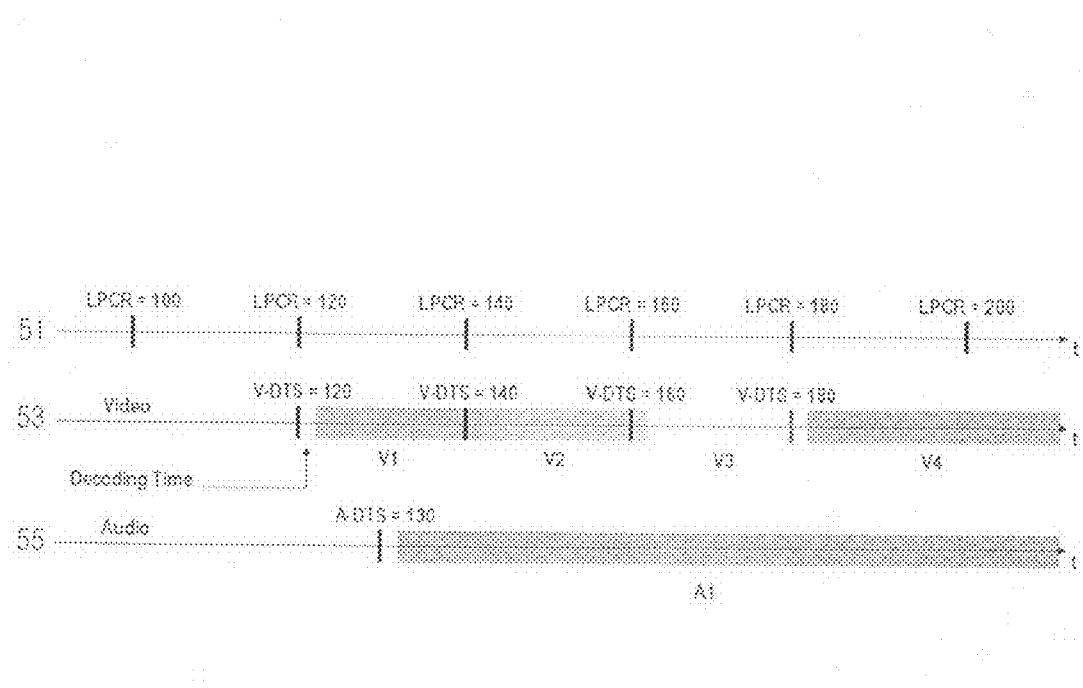
FIG. 4 is a timing chart illustrating operative timing in FIG. 3.
Figure 5:
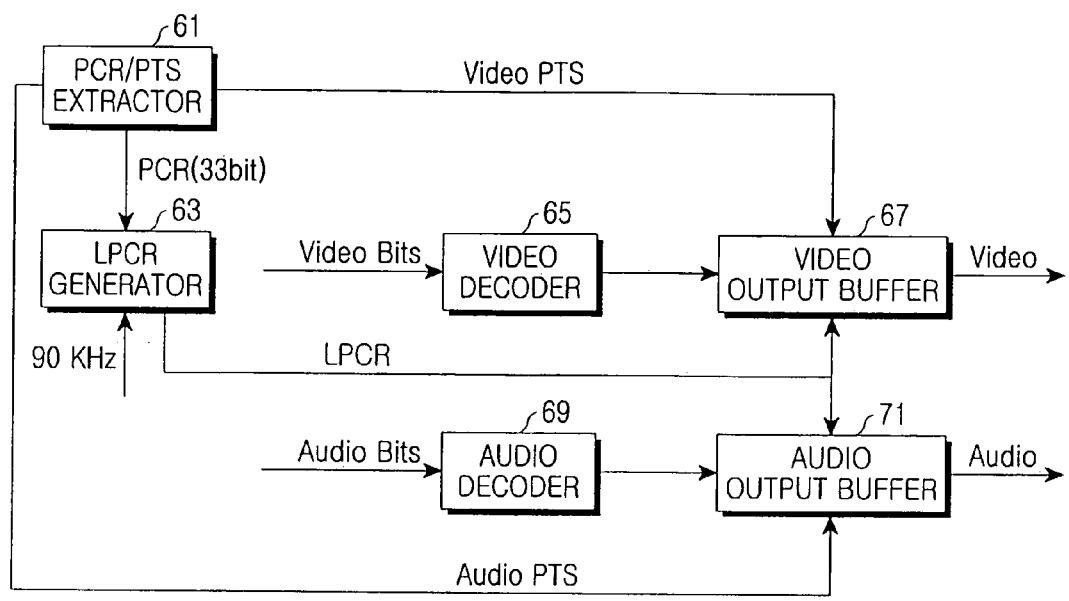
FIG. 5 is a block diagram illustrating a structure of controlling operative timing of a video decode in a conventional digital broadcast receiver.
Figure 6:
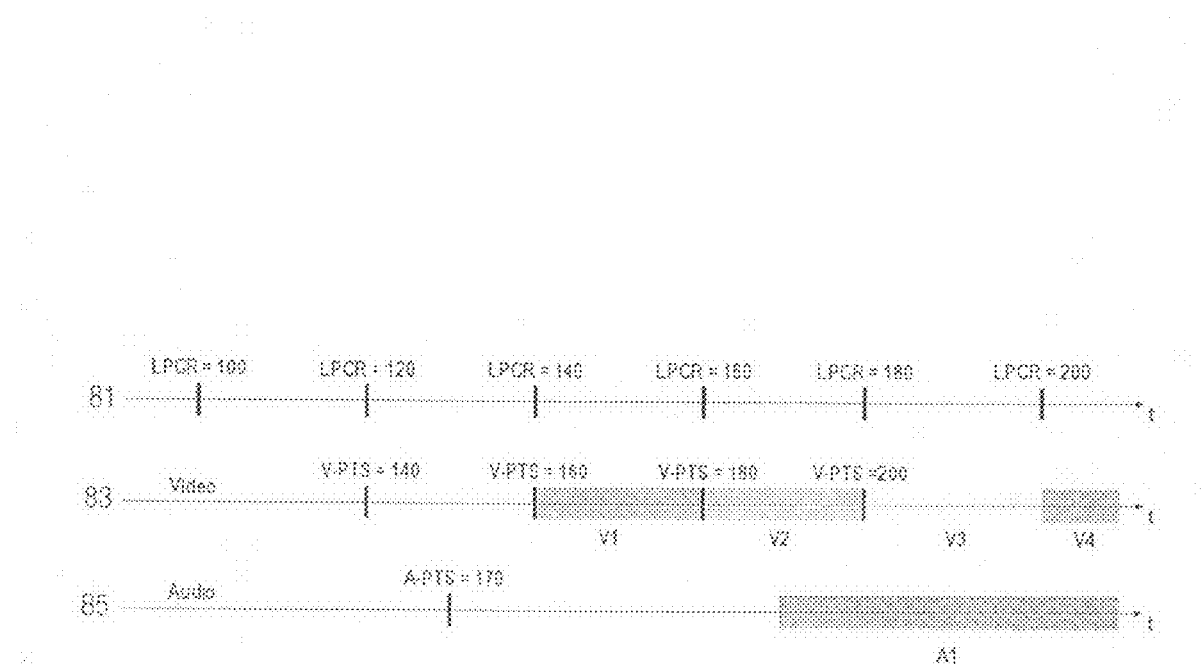
FIG. 6 is a timing chart illustrating operative timing in FIG. 5.
Figure 7:
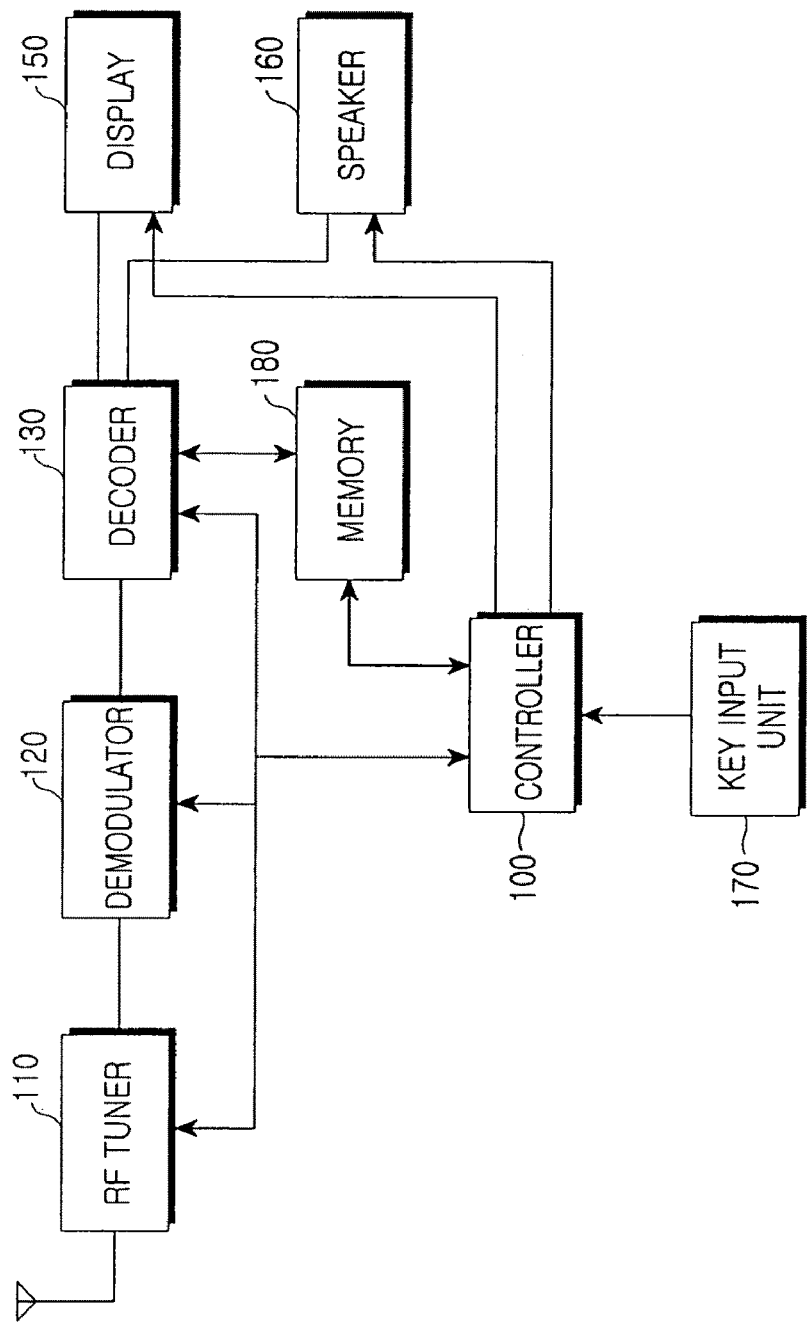
FIG. 7 is a block diagram illustrating a structure of a digital broadcast receiver according to an exemplary embodiment of the present invention.

FIG. 7 illustrates a digital broadcast receiver structure. The structure in FIG. 7 shows a structure including an RF tuner 110, a demodulator 120 and a decoder 130 of the digital broadcast receiver.

Referring to FIG. 7, a digital broadcast signal may be a signal in a VHF (174 MHz-230 MHz: C5-C12) region and/or a UHF (470 MHz-862 MHz: C21-C69) and/or L-band (1452 MHz-1492 MHz) region. If a user selects a broadcast channel via a key input unit 170, a controller 100 outputs control data corresponding to the channel selected in the RF tuner 110. Also, the RF tuner 110 generates and mixes RF frequency according to the channel control data, thereby generating an intermediate frequency signal of the selected channel. In an exemplary implementation, the intermediate frequency may be 36.17 MHz. The intermediate frequency signal is applied to the demodulator 120. Then, the demodulator 120 demodulates and outputs the received signal in a predetermined demodulation scheme. It is assumed that a signal outputted from the demodulator 120 is an MPEG-2 TS (Transport Stream) signal, and this output signal is applied to the decoder 130. Then, the decoder separates the received MPEG-2 TS signal into video, audio and data, decodes each of them, and then outputs them into an image signal and an audio signal. At this time, the video signal may be a RGB signal, a YUV signal or the like, and the audio signal is generally outputted in the form of a pulse code modulated (PCM) stereo sound. A memory is connected to the decoder 130 and controller 100. The video signal outputted from the decoder 130 is outputted to and displayed on a display 150, and the audio signal is applied to and reproduced by a speaker 160.

Figure 8:
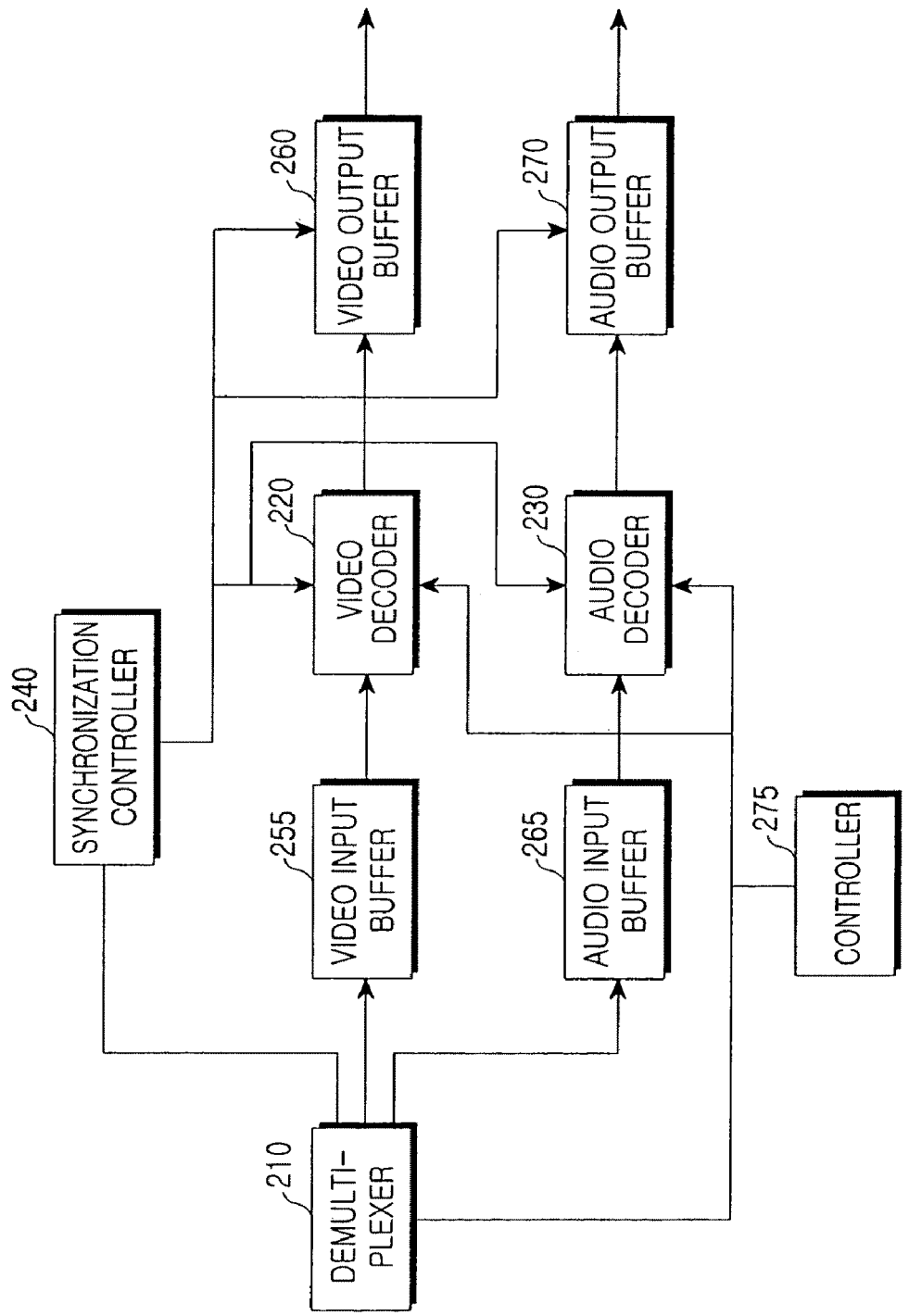
FIG. 8 is a block diagram illustrating a structure of controlling decoding timing of data received in FIG. 7, according to an exemplary embodiment of the present invention.

Hereinafter, the decoder 130 in the digital broadcast receiver having such a structure will be discussed. FIG. 8 illustrates a structure of the decoder 130.

Referring to FIG. 8, a demultiplexer unit 210 performs a function of receiving demodulated MPEG-2 TS data outputted from the demodulator 120 to separate the data into audio, video and other data. At this time, the controller 275 informs the demultiplexer unit 210 of broadcasting information to be selected in the demultiplexer unit 210, that is, a Product identifier (ID) (hereinafter referred to as "PID"), and accordingly the demultiplexer unit 210 chooses target data according to the selected PID, from among various data outputted from the demodulator 120, to separate the chosen data into video and audio. Input buffers 255, 265 are input buffers of a video ES (Elementary Stream) and an audio ES, and function to store data, which are demultiplexed in real time, to the extent that a video decoder 220 and an audio decoder 230 downstream thereof can process the data, respectively. The video decoder 220 is responsible for decoding of the video data. It is common that the digital broadcast receiver receives a MPEG-2 video ES to convert the MPEG-2 video ES into YUV 4:2:0 data. However, since the video signal is outputted adaptively to the display (LCD) of the digital broadcast receiver, the video data may be converted into RGB data. The decoded video signal is stored in a video output buffer 260 and then is outputted at a corresponding outputting time point. The audio decoder 230 is responsible for decoding of the audio signal, and receives a MPEG-2 audio ES to convert it into PCM audio in a similar manner to the video decoding. The converted PCM audio signal is stored in an audio output buffer 270 and then is outputted at a corresponding outputting time point. In an exemplary implementation, the video input buffer 255, the video decoder 220 and the video output buffer 260 may be a video decoding processor unit, and the audio input buffer 265, the audio decoder 230 and the audio output buffer 270 may be an audio decoding processor unit.

A synchronization controller unit 240 inputs an audio decoding control signal (ADTS and/or APTS) and a video decoding control signal (VDTS and/or VPTS) outputted from the demultiplexer unit 210, and reproduces an EPCR from the audio decoding control signal, and synchronizes the video decoding control signal (VDTS and/or VPTS) with the EPCR to generate a signal for controlling video decoding timing. Thus, the synchronization controller unit 240 produces the EPCR, generates a VDTS and/or an ADTS synchronized with the EPCR to control decoding operations of the video decoder 220 and/or the audio decoder 230, and generates a VPTS and/or an APTS to control the video output buffer 260 and/or the audio output buffer 270 such that they output a decoded video signal and/or a decoded audio signal.

Figure 9:
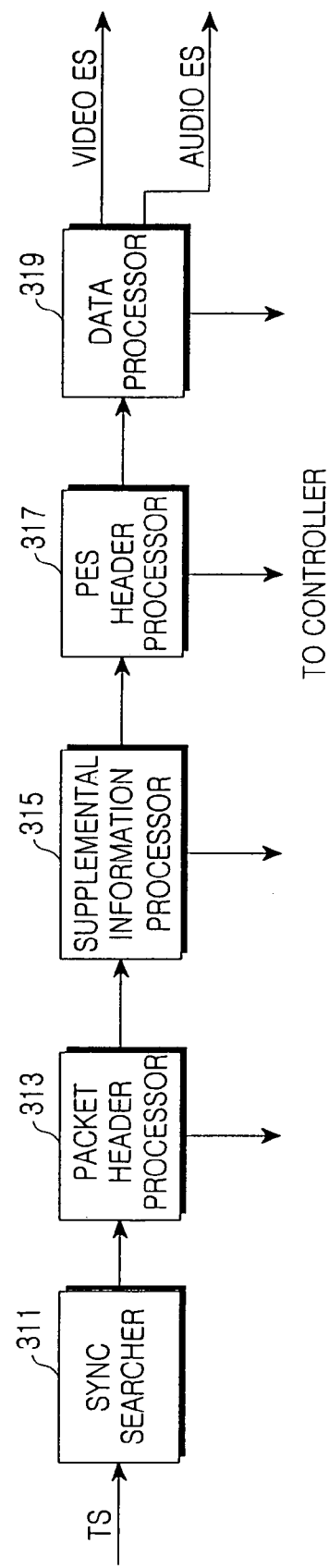
FIG. 9 is a block diagram illustrating a structure of a demultiplexer unit in FIG. 8, according to an exemplary embodiment of the present invention.

FIG. 9 illustrates a structure of the demultiplexer unit 210 in FIG. 8.

Referring to FIG. 9, a synchronization searcher 311 detects a synchronization byte from a packet header of a received TS signal, and stores the received TS signal when the synchronization byte is detected. A packet header processor 313 extracts the packet header from the stored packet-sized data, and processes the extracted packet header. A supplemental information processor 315 analyzes and processes supplemental information included in the packet data. A packetized elementary stream (PES) header processor 317 extracts and processes a PES header in a case where the packet data contains the PES header. A data processor 319 extracts ES (audio, video, program data or the like) from the packet data to output the extracted data into an audio ES, a video ES and a data ES.

The demultiplexer unit 210 having the structure as shown in FIG. 9 is of a serial structure for data processing.

Figure 10:
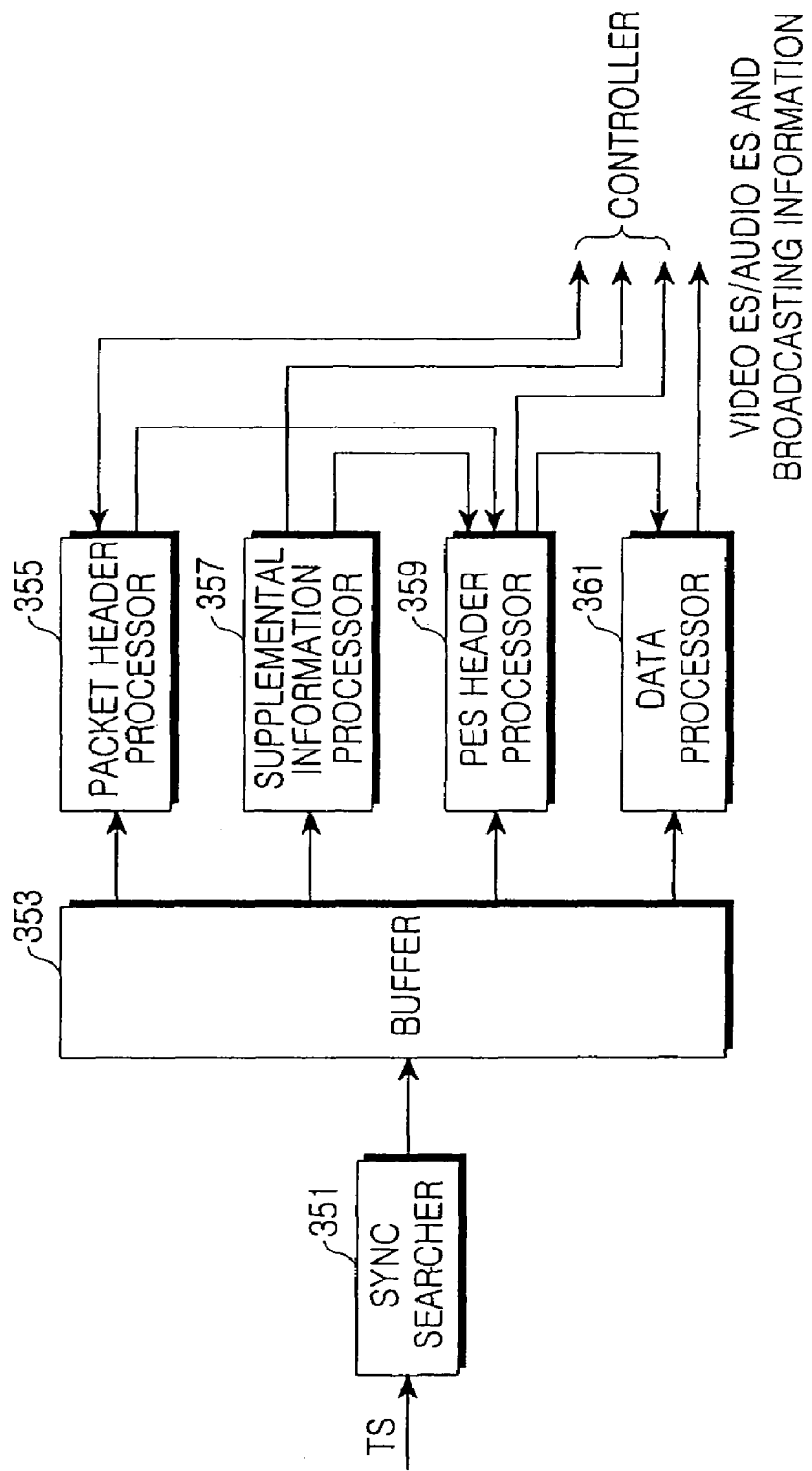
FIG. 10 is a block diagram illustrating a structure of the demultiplexer unit in FIG. 8, according to an exemplary embodiment of the present invention.

FIG. 10 illustrates another structure of the demultiplexer unit 210, which has a parallel structure for data processing.

Referring to FIG. 10, a synchronization searcher 351 searches a synchronization signal included in inputted packet data of a TS signal, and delivers the inputted packet data to a buffer 353. The synchronization searcher 351 according to an exemplary embodiment of the present invention performs synchronization by detecting a synchronization byte of the inputted packet data. The buffer 353 buffers serial data outputted from the synchronization searcher on a packet-by-packet basis.

A packet header processor 355 searches packet header information outputted in parallel from the packet data of the buffer 353 to determine whether supplemental information is included in the packet data, and drives only a PES header processor 359 when the supplemental information is not included, but further drives a supplemental information processor 357 when the supplemental information is included. The packet header processor 355 extracts packet header information from the inputted packet to process the extracted packet header information, and delivers the remaining packet data excluding the packet header to the supplemental information processor 357 if the supplemental information is included, but delivers the remaining packet data excluding the packet header to the PES header processor 359 if the supplemental information is not included.

The supplemental information processor 357 is driven under the control of the packet header processor 355, analyzes and processes the supplemental information included in the packet data if the packet data is delivered from the packet header processor 355, and delivers the remaining packet data excluding the supplemental information to the PES header processor 359.

The PES header processor 359 extracts the header information from the packet data delivered from the packet header processor 355 or the supplemental information processor 357 to process the extracted header information, and delivers the remaining packet data excluding the PES header information to a data processor 361. The data processor 361 processes the packet data, from which the PES header is removed, to deliver the processed packet data to the input buffer of the video decoder 220 or the audio decoder 230.

As stated above, the demultiplexer unit 210 includes 4 processors 355, 357, 359 and 361. Each processor 355, 357, 359 and 361 sequentially analyzes the packet data buffered in the buffer 353, and accesses to the packet data in the buffer 353 to process the packet data when information to be processed thereby is included in the packet data. In an exemplary implementation, a configuration of the packet data may include a packet header, a supplemental information header and a PES header, and information on these headers may or may not be included in the packet header. Thus, each processor 355, 357, 359 and 361 is driven to process the header information when the header information to be processed thereby is included, and such data processing may be conducted in parallel.

FIGS. 11a to 11f illustrate a packet configuration to be processed in the respective processors 313, 315, 317 and 319 in FIG. 9, or the respective processors 355, 357, 359 and 361 in FIG. 10. The following description will be discussed with priority given to FIG. 10.

Referring to FIGS. 11a to 11f, a video packet, an audio packet or a data packet is comprised of a packet header and a payload, and the packet header and the payload consist of 188 bytes. That is, one packet data consists of 188 bytes. The packet header has a size of 4 bytes, and each parameter of the packet header is responsible for the following function as shown in Table 1.

TABLE 1

| Classification | Description | Bits |
| --- | --- | --- |
| sync byte | synchronization byte, 0X47 | 8 |
| Transport error indicator | when error occurs in current packet: 1 | 1 |
| payload start indicator | when current packet is start of PES: 1 | 1 |
| transport priority | used in decoder | 1 |
| PID | identifier classifying packet type | 13 |
| scrambling control | set scrambling mode | 2 |
| adaptation field control | 01: no supplemental information/only payload exists, 10: only supplemental information exists/no payload, 11: both supplemental information and payload exist, 00: reserved | 2 |
| continuity counter | 4 byte counter, increases by 1 for the same PID | 4 |

That is, the packet data begins with a sync byte, and one packet is divided with respect to the sync byte. The synchronization searcher 351 searches inputted packet data to delay data inputting until the sync byte is detected. If the sync byte is detected, the synchronization searcher 351 stores subsequently inputted packet data in the buffer 353.

Figures 11A, 11B, 11C:
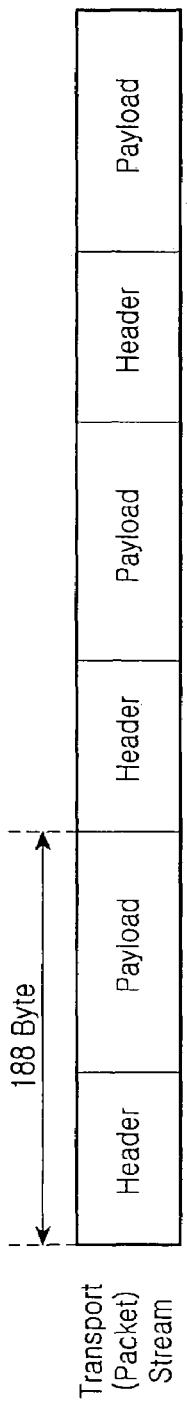

Then, the packet header processor 355 processes the packet header as shown in FIG. 11b. That is, the packet header processor 355 compares an identifier PID, which represents stream information on a video/audio signal of a preset broadcast channel, with a PID of the received packet, and controls the packet buffered in the buffer 353 not to be processed when the packet does not have the preset PID. However, if the packet has the same PID value as that of the preset PID, the packet header processor 355 analyzes the packet to determine whether supplemental information is included. At this time, the packet header processor 355 analyzes the adaptation field control parameter of the packet header to determine. If the packet does not include the supplemental information, that is, the packet is comprised of a PES header and/or actual data (ES), the packet header processor 355 controls the packet data stored in the buffer 353 to be delivered to the PES header processor 359 while omitting the operation of the supplemental information processor 357. When the packet does not include the supplemental information in this way, the PES header and/or the actual data ES are stored in a supplemental information storage region, that is, in the adaptation field of the packet data having the configuration as shown in FIG. 11b. However, if the packet data includes the supplemental information, the packet data has the configuration as shown in FIG. 11b, and the supplemental information may be included in the adaptation field or the supplemental information and the PES header and/or the actual data ES may be included in the adaptation field. Then, the packet header processor 355 controls the data buffered in the buffer 353 to be delivered to the supplemental information processor 357. At this time, the packet header of 4 bytes is removed from the data delivered to the supplemental information processor 357.

The supplemental information processor 357 operates under the control of the packet header processor 355. The supplemental information processor 357 processes data included in the adaptation field, and the data in the adaptation field has the configuration as shown in FIGS. 11c and 11d. FIG. 11c illustrates the configuration of an adaptation field header. The adaptation field includes information such as adaptation field length, an ES priority indicator and the like, and has flag (5 flags) parameters representing whether optional field 1 is included. At this time, when the optional field 1 is included, a corresponding flag (or corresponding flags) of the 5 flags region as shown in FIG. 11c is/are set, and supplemental information corresponding to the set flag (flags) are included in the optional field 1. The supplemental information included in the optional field 1 may have a configuration as shown in FIG. 11d. Referring to FIG. 11d, the optional field 1 includes a PCR and other supplemental information available for decoding. FIGS. 11c and 11d illustrate the supplemental information for decoding the received packet data, which are included if necessary.

The PES header processor 359 and the data processor 361 process packets which the packet header 355 determines those not including the supplemental information or which are left after the supplemental information processor 357 processes the supplemental information. The PES header processor 359 processes PES header information as shown in FIGS. 11e and 11f. FIG. 11e illustrates a PES header configuration. The PES header includes information such as PES scrambling control, PES priority, copyright, original/copy, 7 flags, PES data length, and the like, and further includes PES optional field 1 if necessary. FIG. 11f illustrates a configuration of the PES optional field 1, and the PES optional field 1 includes information such as PTS/DTS. The PTS is time information for presenting data, which is decoded in the video decoder 220 or the audio decoder 230, on the display 150, and the decoded data is presented on the display 150 at a time of the PTS. The DTS is time information for starting decoding by the video decoder 220 or the audio decoder 230, and the decoder starts to decode the inputted packet data at a time of the DTS.

The PES header processor 359 processes the PES header having the configuration as shown in FIGS. 11e and 11f, and delivers the actual data ES excluding the PES header to the data processor 361. At this time, the actual ES is ES, from which the header information included in the packet data are all removed, and the data processor 361 functions to separate the delivered ES data into a video ES signal and an audio ES signal.

As stated above, the demultiplexer unit 210 having the structure as shown in FIG. 9 or 10 performs a function of extracting a PCR, a DTS or a PTS. The PCR, the DTS or the PTS is used as reference time for decoding data of a received packet, that is, an ES. Also, the DTS and the PTS are determined according to the type of received packet as stated above. That is, if the received packet is a video packet, the DTS and the PTS become a VDTS and a VPTS. Otherwise, if the received packet is an audio packet, the DTS and the PTS become an ADTS and an SPTS.

In an exemplary embodiment of the present invention, a PCR is estimated using not the LPCR but the ADTS or APTS. Hereinafter, such an estimated PCR generated using the ADTS or APTS will be referred to as "EPCR". The EPCR information changes when the ADTS or APTS is updated. That is, the EPCR information discretely changes. In general, since the operation load of audio is sufficiently smaller than that of video, the ADTS is substantially the same as the APTS. The inputted audio data is immediately decoded, and is ceaselessly and continuously outputted. Thus, the ADTS or APTS can be updated right away into the EPCR.

The determination of a decoding start time point or an outputting time point of video is conducted with reference to a VDTS or VPTS value. Since a difference between the VDTS and the VPTS is great in a case of video, the video data stored in the input buffer may start to be decoded by means of the VDTS or may be presented after decoded immediately the moment the EPCR becomes greater than the VPTS value. Thus, an audio/video (A/V) LIP-sync error is dependent on the update speed of the ADTS or APTS. Since the ADTS is generally updated once per 100 ms, and video reproducing speed specified in digital broadcast system (for example, DVB-T) specifications is usually 25 fps (frame per second), the LIP-sync error is corrected every 2.5 frames. Therefore, if the update time of the ADTS or APTS is shortened, the LIP-sync error can be reduced. In this way, the LPCR is not used, which results in the implementation of a simple PCR reproduction method capable of being very appropriately used in a mobile environment such as a portable terminal.

Accordingly, in an exemplary embodiment of the present invention, the LPCR is not used, and the EPCR is generated using the ADTS or APTS. In a case of audio, audio decoding starts using the ADTS or the outputting time point of decoded audio is determined using the APTS. In a case of video, the decoding time point of video is determined by means of the comparison of the EPCR and the VDTS or the outputting time point of decoded video data is determined by means of the comparison of the EPCR and the VPTS.

Figure 12A:
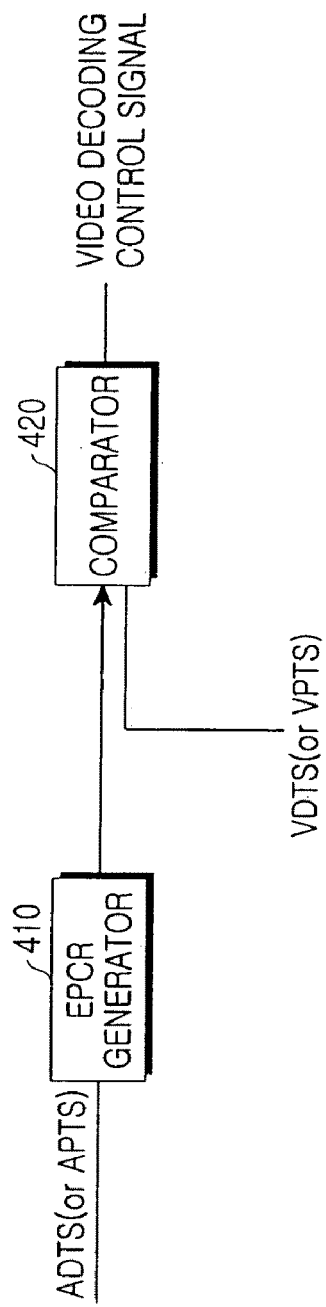
FIGS. 12a and 12b are block diagrams illustrating a structure of a synchronization controller unit according to an exemplary embodiment of the present invention.
Figure 12B:
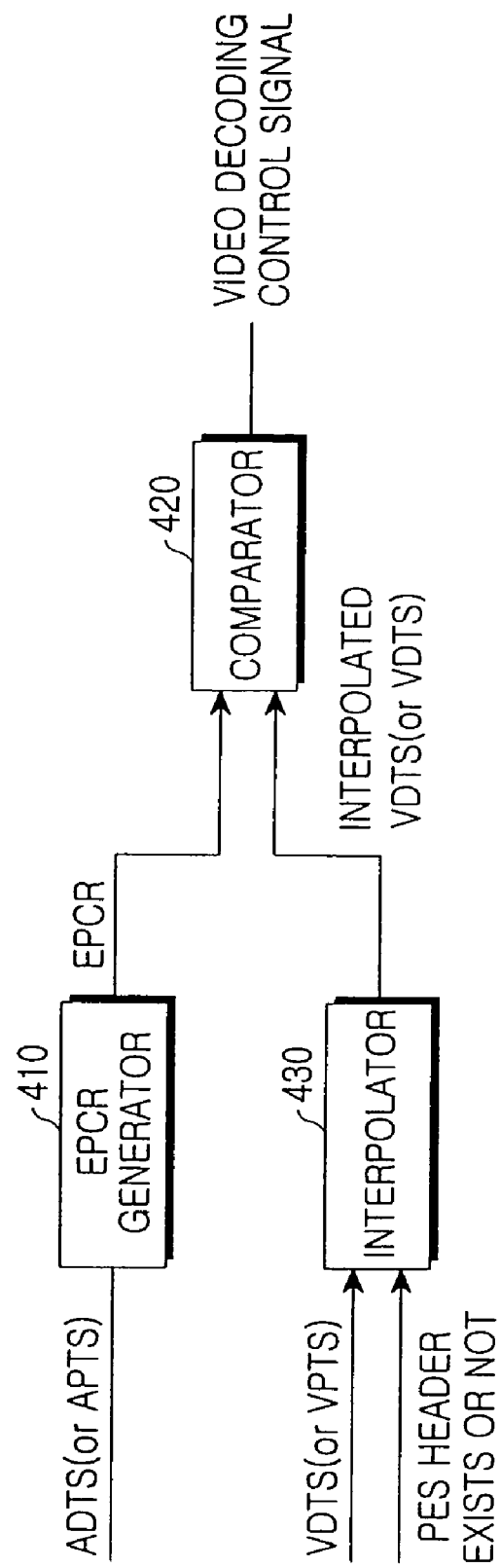

FIGS. 12a and 12b illustrate a structure of the synchronization controller unit 240 in accordance with an exemplary embodiment of the present invention.

Referring to FIGS. 12a and 12b, an EPCR generator 410 generates an ADTS or APTS, which is extracted in the PES header processor 359 of the demultiplexer unit 210, into an EPCR. The ADTS or APTS is applied as an audio decoding control signal of the audio decoder 230. Then, a comparator 420 compares the EPCR with a VDTS or VPTS outputted from the PES header processor 359 to generate a video decoding control signal for controlling the video decoder 220 when the EPCR corresponds with the VDTS or VPTS. Thus, the comparator 420 may be a decoding control signal generator which analyzes the inputted VDTS or VPTS based on the EPCR to generate a signal for controlling decoding of the video decoder 220.

At this time, the ADTS or APTS is not generated every frame, and the audio decoder 230 continuously decodes a plurality of audio frames when the decoding control signal is generated. In contrast with this, the video decoder 220 decodes video frame data on a frame-by-frame basis, and the video decoding control signal may be controlled as to be generated every frame. Also, the VDTS or VPTS is not received every frame. Thus, on a receiving side, video decoding control signals for all of received video frames may be generated based on the VDTS or VPTS. An interpolator 430 is used for this purpose. The interpolator 430 inputs a VDTS or VPTS outputted from the PES header processor 359 and a signal representing whether a PES header exists. The interpolator 430 stores the VDTS or VPTS inside thereof when the VDTS or VPTS is inputted, and performs an interpolation operation to generate an interpolated VDTS or VPTS whenever the PES header is detected until a new VDTS or VPTS is inputted. Also, if a new ADTS or VPTS is inputted, the interpolator 430 initializes the current VDTS or VPTS value, and stores the new VDTS or VPTS inside thereof to repeatedly perform the above-mentioned interpolation operation. As described, the interpolator 430 performs the interpolation operation to generate the interpolated VDTS or VPTS whenever a video frame header not including the VDTS or VPTS is received. Thus, the comparator 420 can input the VDTS or VPTS and thus generate a signal for controlling the video decoding on a frame-by-frame basis.

Figure 13A:
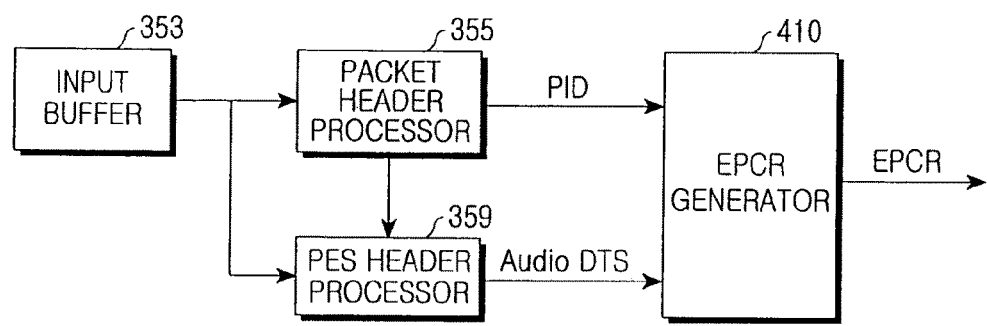
FIGS. 13a and 13b are a block diagram and a flowchart illustrating a structure and a procedure in which a PCR generator updates an EPCR by using an ADTS in FIG. 12, according to an exemplary embodiment of the present invention, respectively.
Figure 13B:
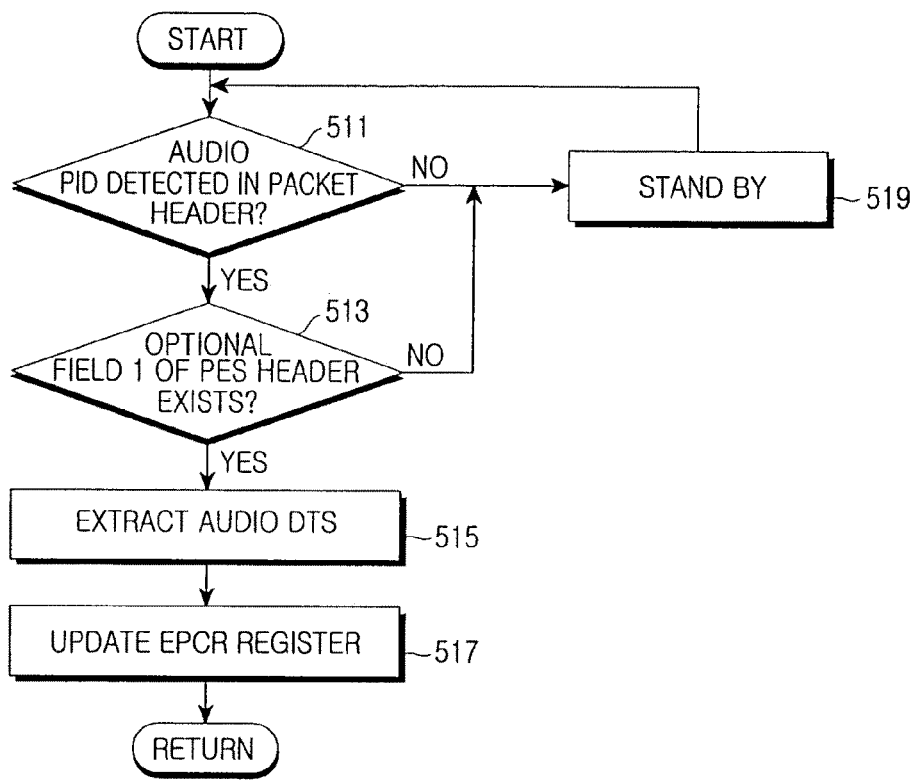

FIGS. 13a and 13b illustrate a device and a procedure for generating an EPCR by using an ADTS.

Referring to FIG. 13a, if an audio packet is stored in the input buffer 353, the packet header processor 355 verifies a PID of the stored audio packet to determine whether the packet has a preset PID. At this time, if the packet has the preset PID, the PES header processor 359 detects an ADTS included in a PES frame header to deliver the detected ADTS to the EPCR generator 410. The EPCR generator 410 then stores the ADTS value as an EPCR therein.

Referring to FIG. 13b, if an audio packet is stored in the input buffer 353, in step 511, the packet header processor 355 accesses a PID of an audio packet header stored in the input buffer 353 to compare it with a preset PID. At this time, if the PID of the packet is not the same as the preset PID, in step 519, the packet header processor 355 terminates a demultiplexing procedure of the packet, and stands by until a next packet is received. However, if the two PIDs have the same value, the PED header processor 359 analyzes whether the received packet includes a PES header. When the packet includes the PES header, the PES header processor 359 senses the PES header in step 513, and extracts an ADTS included in the PES header to then output the extracted ADTS to the EPCR generator 410 in step 515. Thereupon, in step 517, the EPCR generator 410 updates the received ADTS value into an EPCR value.

Figure 14A:
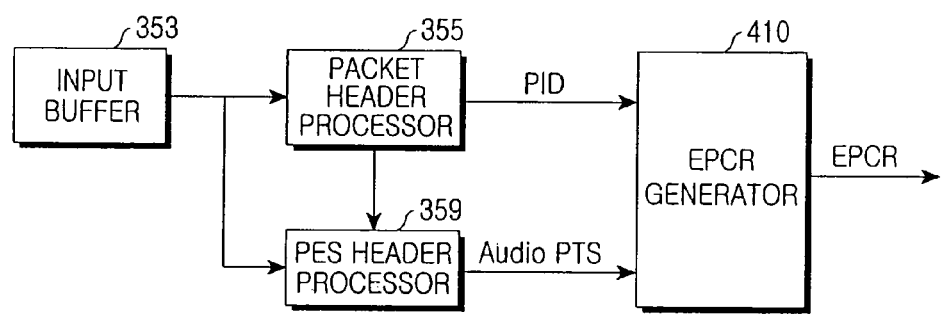
FIGS. 14a and 14b are a block diagram and a flowchart illustrating a structure and a procedure in which a PCR generator updates an EPCR by using an APTS in FIG. 12 according to an exemplary embodiment of the present invention, respectively.
Figure 14B:
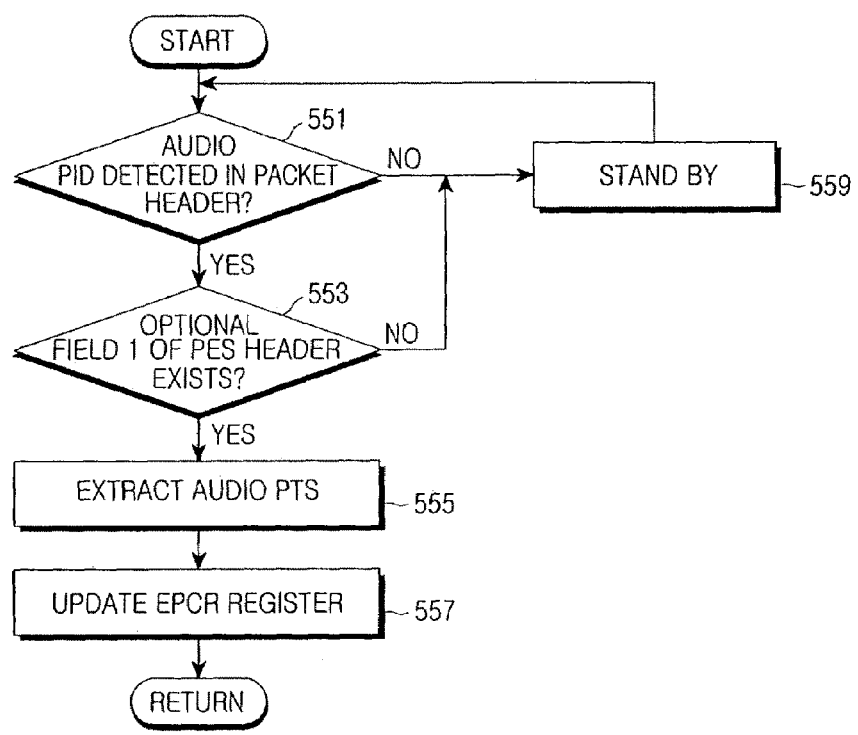

FIGS. 14a and 14b illustrate a device and a procedure for generating an EPCR by using an APTS.

Referring to FIG. 14a, if an audio packet is stored in the input buffer 353, the packet header processor 355 verifies a PID of the stored audio packet to determine whether the packet has a preset PID. At this time, if the packet has the preset PID, the PES header processor 359 detects an ADTS included in a PES frame header to deliver the detected APTS to the EPCR generator 410. The EPCR generator 410 then stores the APTS value as an EPCR therein.

Referring to FIG. 14b, if an audio packet is stored in the input buffer 353, in step 551, the packet header processor 355 accesses a PID of an audio packet header stored in the input buffer 353 to compare it with a preset PID. At this time, if the PID of the packet is not the same as the preset PID, in step 559, the packet header processor 355 terminates a demultiplexing procedure of the packet, and stands by until a next packet is received. However, if the two PIDs have the same value, the PED header processor 359 analyzes whether the received packet includes a PES header. When the packet includes the PES header, the PES header processor 359 senses the PES header in step 553, and extracts an APTS included in the PES header to then output the extracted APTS to the EPCR generator 410 in step 555. Thereupon, in step 557, the EPCR generator 410 updates the received APTS value into an EPCR value.

The ADTS or APTS is applied to the audio decoder 230 or the audio output buffer 270 to be used as a decoding control signal of an audio packet. Also, if the EPCR is generated, the comparator 420 compares the EPRC with a VDTS or VPTS to generate a control signal for starting video decoding or a control signal for controlling outputting of decoded video according to a result of the comparison. That is, based on the EPCR, the comparator 420 analyzes the VDTS or VPTS outputted from the PES header processor 359 to generate a video control signal for decoding of video data.

As stated above, if an ADTS or APTS exists in an audio packet after the audio packet is analyzed, the ADTS or APTS is stored as an EPCR used in an exemplary embodiment of the present invention, and the EPCR is compared with a VDTS or VPTS to generate a decoding control signal for controlling decoding start or outputting of decoded data. That is, in an exemplary embodiment of the present invention, an ADTS or APTS included in an audio packet is estimated into a PCR, and the estimated PCR (EPCR) is used as reference time information for controlling decoding of received information (video, audio and program data).

At this time, the DTS and the PTS is not received in every frame. Thus, in order to decode video of every frame, the video control signal generated by the ADTS or APTS and the VDTS or VPTS is buffered, and time is cumulated until a next video control signal is generated. In the meantime, if the PES header processor 355 detects the PES header, the current cumulative time value can be used as the video decoding control signal (VDTS or VPTS) by carrying out the interpolation operation at the corresponding time point. FIGS. 15a to 15d are views for explaining an operation of the interpolator 430, and FIG. 16 is a flowchart for explaining procedure flows of the interpolation operation in FIGS. 15a to 15d.

Figure 15A:
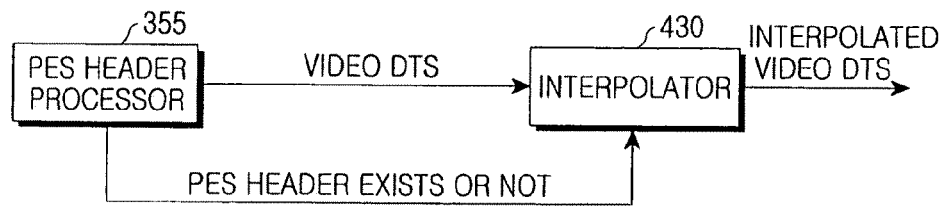
FIGS. 15a to 15d are views illustrating a structure in which an interpolator updates a video decoding control signal in FIG. 12, according to an exemplary embodiment of the present invention.
Figure 15B:
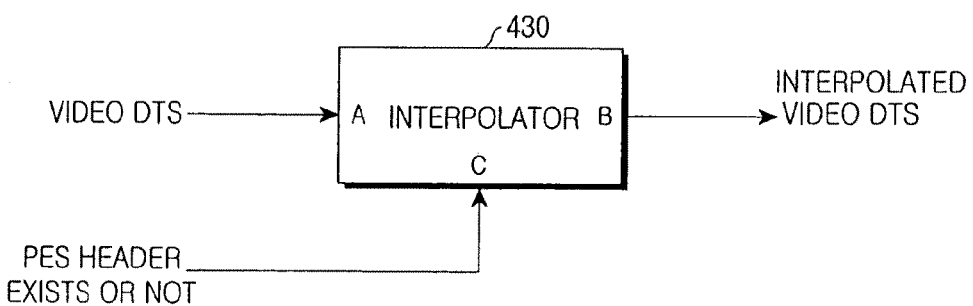
Figure 15C:
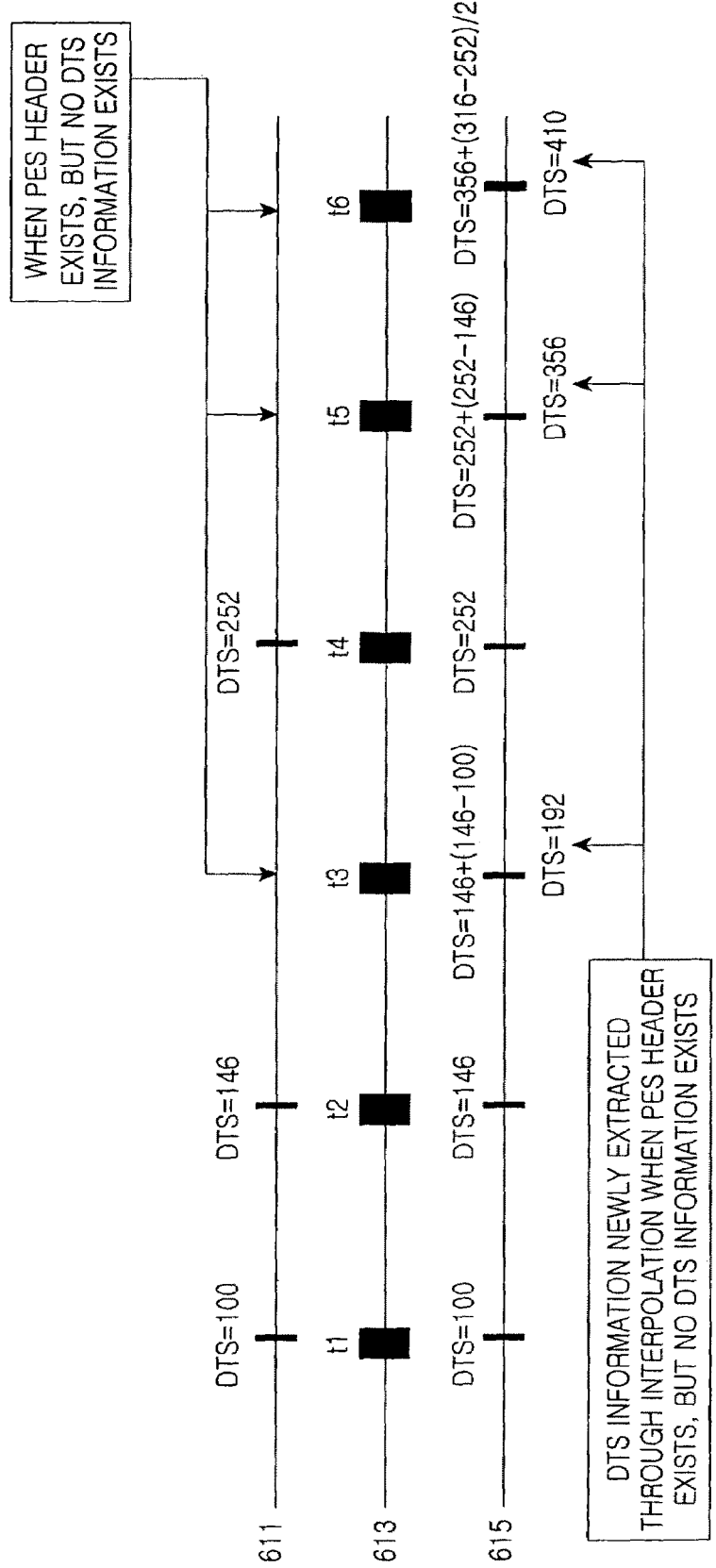
Figure 16:
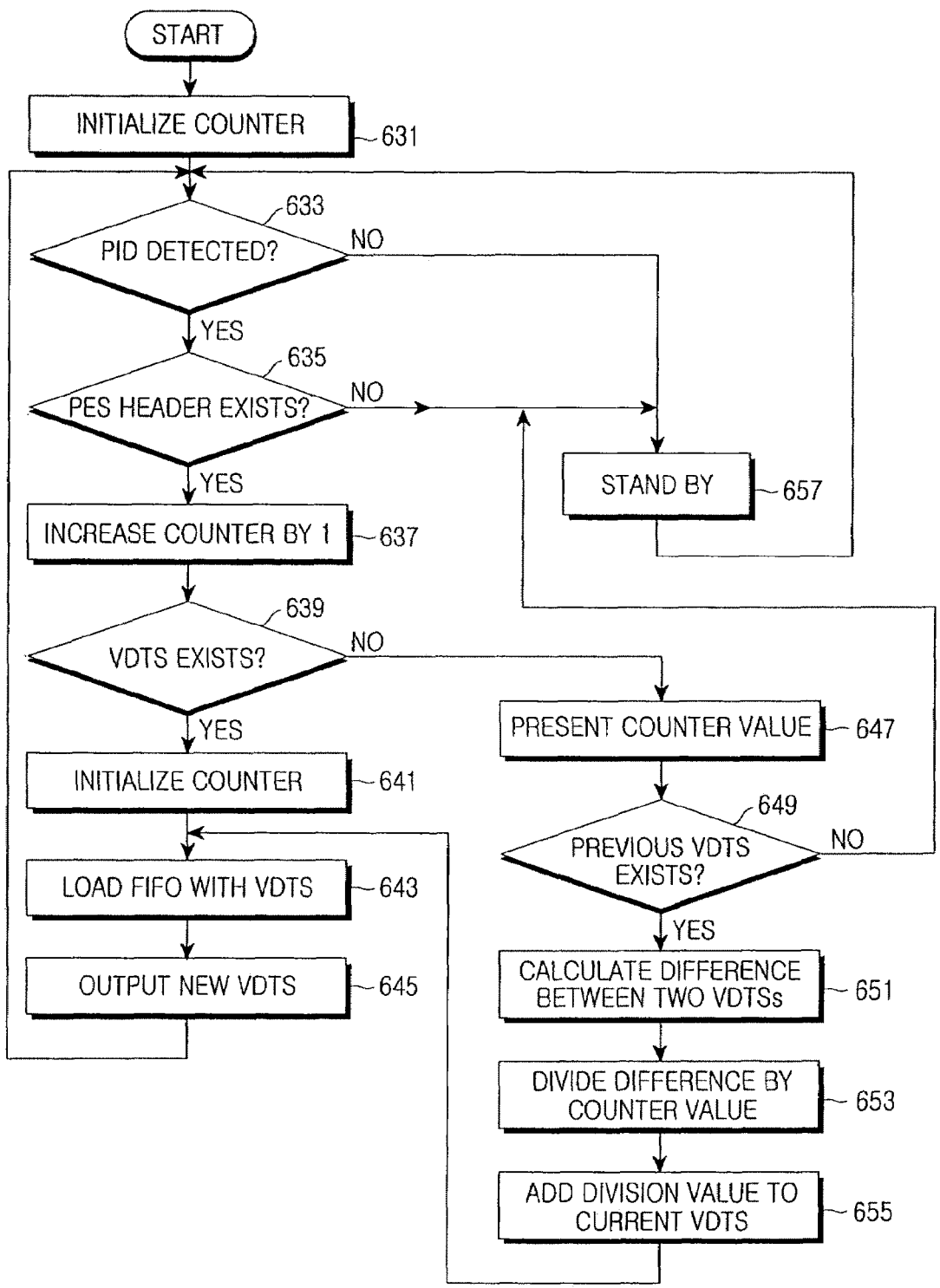
FIG. 16 is a flowchart illustrating a procedure of generating a decoding control signal in a synchronization controller unit, according to an exemplary embodiment of the present invention.

Referring to FIGS. 15a to 15c, the interpolator 430 inputs a VDTS or VPTS extracted in the PES header processor 355 and inputs a PES header detection signal detected in the PES header processor 355 as shown in FIG. 15a. FIG. 15b illustrates a connection relation of the interpolator 430. If the VDTS or VPTS is inputted, the interpolator 430 delivers the VDTS or VPTS to the comparator 420. Also, if a video PS header not including the VDTS or VPTS is inputted, the interpolator 430 performs an interpolation operation to deliver the interpolated VDTS or VPTS to the comparator 420. Therefore, the comparator 420 can input the VDTS or VPTS on a frame-by-frame basis, and generates a video decoding control signal for every frame.

FIG. 15c illustrates an operation in which the interpolator 430 generates an interpolated VDTS or VPTS. FIG. 15c represents an interpolation procedure in a case of using a VDTS. Reference numeral "611" in FIG. 15c indicates a frame, which includes a VDTS, and a VDTS value. Reference numeral "613" in FIG. 15c indicates a frame interval in which a PES header is detected. In an exemplary implementation, t1, t2 and t3 denote video frames including the VDTS, and t4, t5, and t6 denote video frames not including the VDTS. In a case of the frame including the VDTS, the interpolator 430 delivers the corresponding VDTS value to the comparator 420 without any manipulation. However, in a case of the frame not including the VDTS, the interpolator 430 generates an interpolated VDTS to deliver it to the comparator 420, as indicated by reference numeral "615". It is assumed that a VDTS of a previous frame prior to a current frame is a first VDTS, and a VDTS of a previous frame prior to the first VDTS is a second VDTS. In the VDTS generation procedure performed by the interpolator 430, a VDTS of the current frame is obtained first by subtracting the second VDTS from the first VDTS. Secondly, the subtraction value is divided by the number of consecutive frames not including the VDTS. Thirdly, the calculation value in the second division process is added to the first VDTS to generate the addition value into the interpolated VDTS. To give an example of generating the interpolated VDTS in this way, a VDTS of frame t3 becomes a value of (VDTS of frame t2+(VDTS of frame t2−VDTS of frame t1)), and a VDTS of frame t6 become a value of (VDTS of frame t5+(VDTS of frame t5−VDTS of frame t4/2)). This can be expressed by the following equation:

$$VDTS+(VDTS1-VDTS)/P \quad (1)$$

where, VDTS1 denotes a current VDTS, VDTS denotes a previous VDTS, and P denotes the number of frames which are consecutively received without the VDTS. Although the foregoing has been described on the assumption of using the VDTS, an interpolated VPTS can be generated in the same manner in a case of using the VPTS.

Figure 15D:
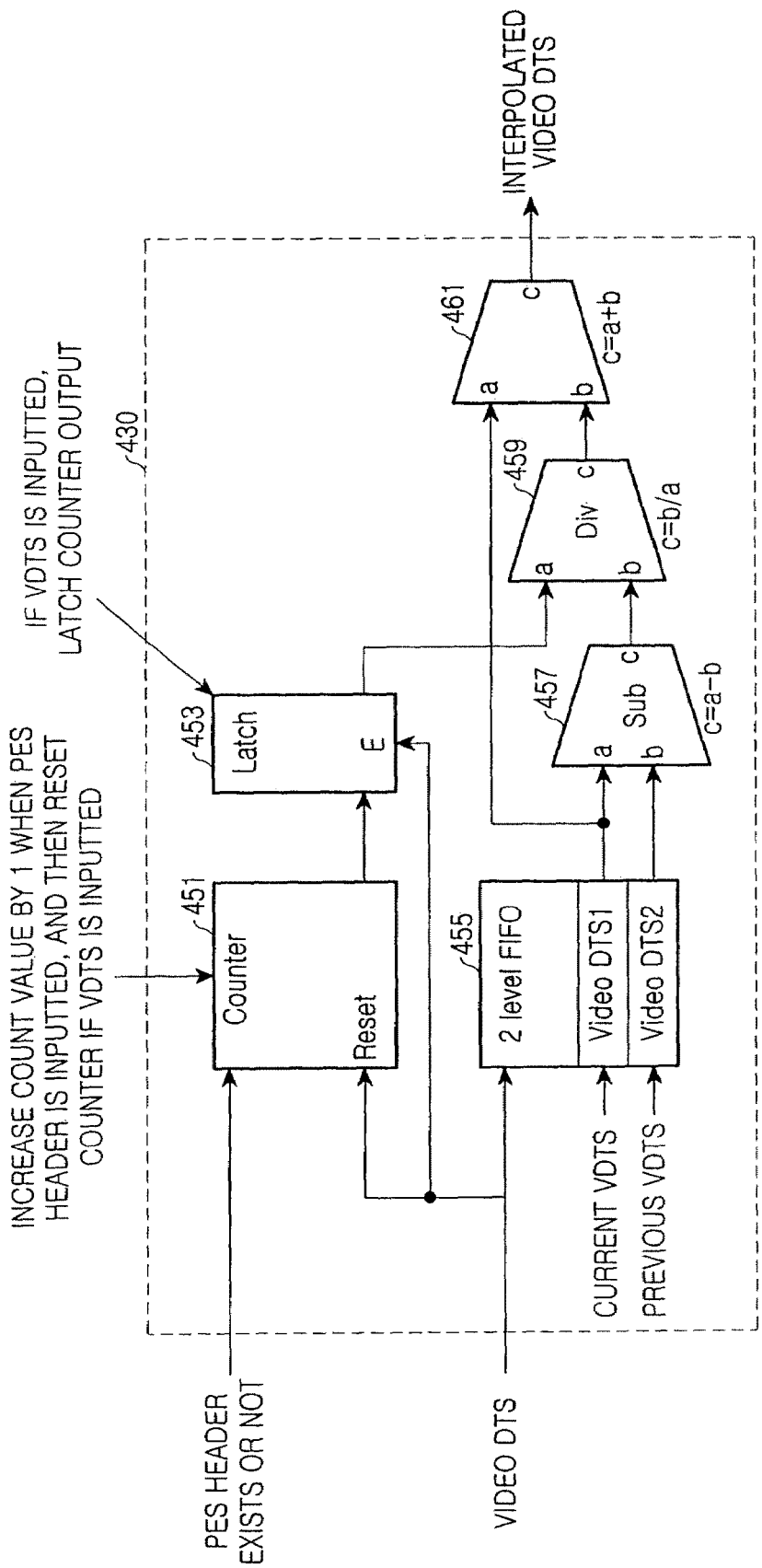

FIG. 15d illustrates a structure of the interpolator 430 for interpolating a VDTS through the procedure as shown in FIG. 15c.

Referring to FIG. 15d, a counter 451 counts the PES header detection signals like reference numeral "613", and is initialized when a VDTS like reference numeral "611" is detected. A Latch 453 latch-disables an output of the counter 451 when the VDTS detection signal occurs, but otherwise latch-enables the output of the counter 451. A FIFO 455 inputs the VDTS. The FIFO 455 also inputs a VDTS outputted from an adder 461. At this time, the VDTS outputted from the adder 461 may be a VDTS of a current frame or an interpolated VDTS. That is, the FIFO 455 inputs a VDTS to store it as a current VDTS when a currently inputted frame includes the VDTS, and stores an interpolated VDTS outputted from the adder 461 as a current VDTS when the frame includes no VDTS. Also, when the VDTS changes, the FIFO 455 stores the current VDTS as a previous VDTS, and updates an inputted VDTS into a current VDTS. A subtracter 457 generates a value obtained by subtracting an inputted VDTS from the current VDTS. A divider 459 divides an output of the subtracter 457 by an output of the counter 451 outputted from the latch 453. The adder 461 adds an output of the divider 459 to the current VDTS to generate an interpolated VDTS. Thus, as expressed by Equation (1), the interpolated VDTS can be generated from a frame not including the VDTS or the VDTS can be generated from a frame including the VDTS.

FIG. 16 is a flowchart illustrating a procedure of generating a VDTS or VPTS through a method as expressed by Equation (1).

Referring to FIG. 16, a count value of the counter 451 is in an initialized state in step 631. Thereafter, if a packet is received, in step 633, a PID of the received packet is verified to determine whether the PID of the received packet is a preset PID of video. At this time, when the packet includes a PES header, in step 635, the interpolator 430 senses that the packet is a start packet of a video frame, and increases the count value of the counter 451 by 1 in step 637. If the packet does not include a PES header, in step 657, the interpolator 430 stands by until a next packet is received. Next, in step 639, whether the PES optional field 1 exists in the PES header as shown FIG. 11e is verified, and if the PES optional field 1 exists, a VDTS is extracted from the PES optional field 1 as shown in FIG. 11f. Once the VDTS is extracted, the count value of the counter 451 is initialized in step 641, and the extracted VDTS is loaded as a current VDTS (VDTS1) into the FIFO 455 and the current stored VDTS is stored as a previous VDTS (VDTS2) in the FIFO 455 in step 643. Thereafter, in step 645, the interpolator 430 outputs the extracted current VDTS (VDTS 1) to the comparator 420.

However, when the VDTS is not included in the PES header, in step 639, the interpolator 430 senses this situation, and latches the count value of the counter 451 through the latch 453 in step 647. Next, in step 649, the interpolator 430 determines whether the previous VDTS (VDTS2) exists in the FIFO 455. If the previous VDTS (VDTS2) exists, the interpolator 430 calculates a difference between the two VDTSs (VDTS1−VDTS2) in step 651, divides the difference (VDTS1−VDTS2) by the count value (P) ((VDTS1−VDTS2)/2) in step 653, and adds the division value to the current VDTS (VDTS1) ((VDTS1−VDTS2)/2+VDTS1) in step 655. Thereafter, the interpolator 430 stores the VDTS calculated in step 655 as the current VDTS (VDTS1) in the FIFO 455, stores the currently stored VDTS as the previous VDTS (VDTS2) in the FIFO 455 in step 643, and delivers the VDTS calculated in step 655 to the comparator 420 in step 645. As stated above, if a received PES header does not include a VDTS, the interpolator 430 performs steps 647 to 655 to generate an interpolated VDTS and deliver it to the comparator 420. Consequently, the comparator 420 inputs VDTSs received or interpolated from every video frames, and thus can generate video decoding control signals for every video frames.

Figure 17:
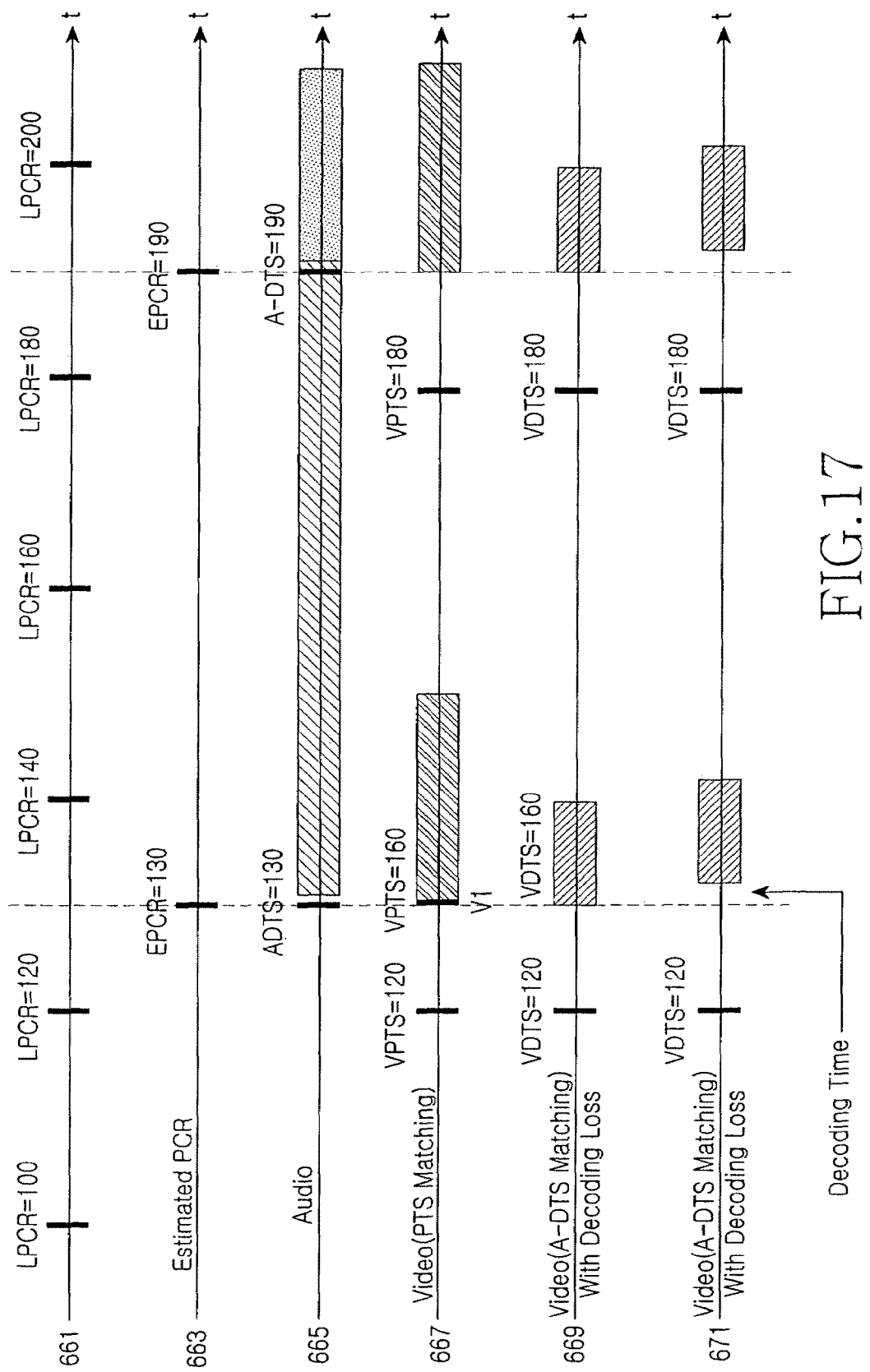
FIG. 17 is a timing chart for explaining decoding timing control in a digital broadcast receiver, according to an exemplary embodiment of the present invention.

FIG. 17 is a timing chart for a LIP-sync technique of a DVB receiver in accordance with an exemplary embodiment of the present invention.

The VDTS or VPTS generation procedure in FIG. 16 does not use LPCR information as designated by reference numeral "661" in FIG. 17. Instead of the LPCR information, an ADTS or APTS is used for generating EPCR information as designated by reference numeral "663" and the LPCR information is replaced by the EPCR information. On account of this, the EPCR information according to an exemplary embodiment of the present invention, which is used as the LPCR information, is updated whenever the ADTS or APTS is updated, and thus the EPCR information is discretely updated, as indicated by reference numeral "663" in FIG. 17. However, since the operation load of audio is sufficiently small in the environment of a portable terminal, the ADTS is substantially the same as the APTS. Inputted audio data is immediately decoded, and is ceaselessly and continuously reproduced. Thus, the audio data is decoded and outputted by means of the ADTS or APTS as soon as it is inputted as indicated by reference numeral 665".

The determination of a decoding start time point or an outputting time point of video data is conducted with reference to a VDTS or VPTS value. In an exemplary implementation, the VDTS is a signal for determining the decoding start time point of inputted video data, the VPTS is a signal for determining the outputting time point of decoded video data to present the video data. Also, the VDTS or VPTS is activated at a point of time when the EPCR becomes greater than the VPTS. That is, the synchronization controller unit 240 extracts the VDTS or VPTS to compare it with the EPCR, and activates and outputs the VDTS or VPTS when the EPCR has a time value equal to or greater than the time value of the VDTS or VPTS. Thus, in a case of using the VDTS, the video decoder 220, which the video data is inputted, performs a decoding operation by the VDTS, as indicated by reference numeral "671" in FIG. 17, and the video output buffer 260 immediately outputs decoded video data to the display 150. In FIG. 17, reference numeral "671" represents timing in which a decoding loss is taken into consideration, and reference numeral "669" represents timing in which the decoding loss is not taken into consideration. In using the VPTS, the video decoder 220 performs a decoding operation at a point of time when video data is inputted. Also, the video output buffer 260 buffers decoded video data, and outputs the buffered video data to the display 150 when the VPTS is generated, as indicated by reference numeral "667".

In a case of video, since a difference between the DTS and the PTS is greater than in a case of audio, video data inputted in the video input buffer 255 may start to be decoded or may be presented at a point of time when the EPCR becomes greater than the VDTS or VPTS value. Thus, a LIP-sync error of the video data is dependent on the update speed of the ADTS or APTS.

In an exemplary embodiment of the present invention, in which a decoding control signal is generated as described above, a PCR is replaced by an EPCR which is generated using the ADTS or APTS. Also, the VDTS or VPTS is used for controlling video decoding in the video decoder 220, and a previous VDTS or VPTS is interpolated for a video frame not including the VDTS or VPTS, so a video decoding control signal is generated for every frame. In an exemplary embodiment of the present invention, outputting of the video decoder 220 is controlled using the EPCR and the VPTS, in which a decoding time point of the video decoder 220 is controlled using the EPCR and the VPTS, the decoding time point of the video decoder 220 is controlled using the EPCR and the VDTS, and the decoding time point and the outputting of the video decoder 220 are controlled using the EPCR, the VDTS and the VPTS. In an exemplary embodiment of the present invention, the interpolator 430 is omitted. However, the comparator 420 may include the interpolator 430 as shown in FIG. 15d and may perform the interpolation operation as shown in FIG. 16. Thus, a description of the interpolator 430 will be omitted for clarity and conciseness.

Figure 18:
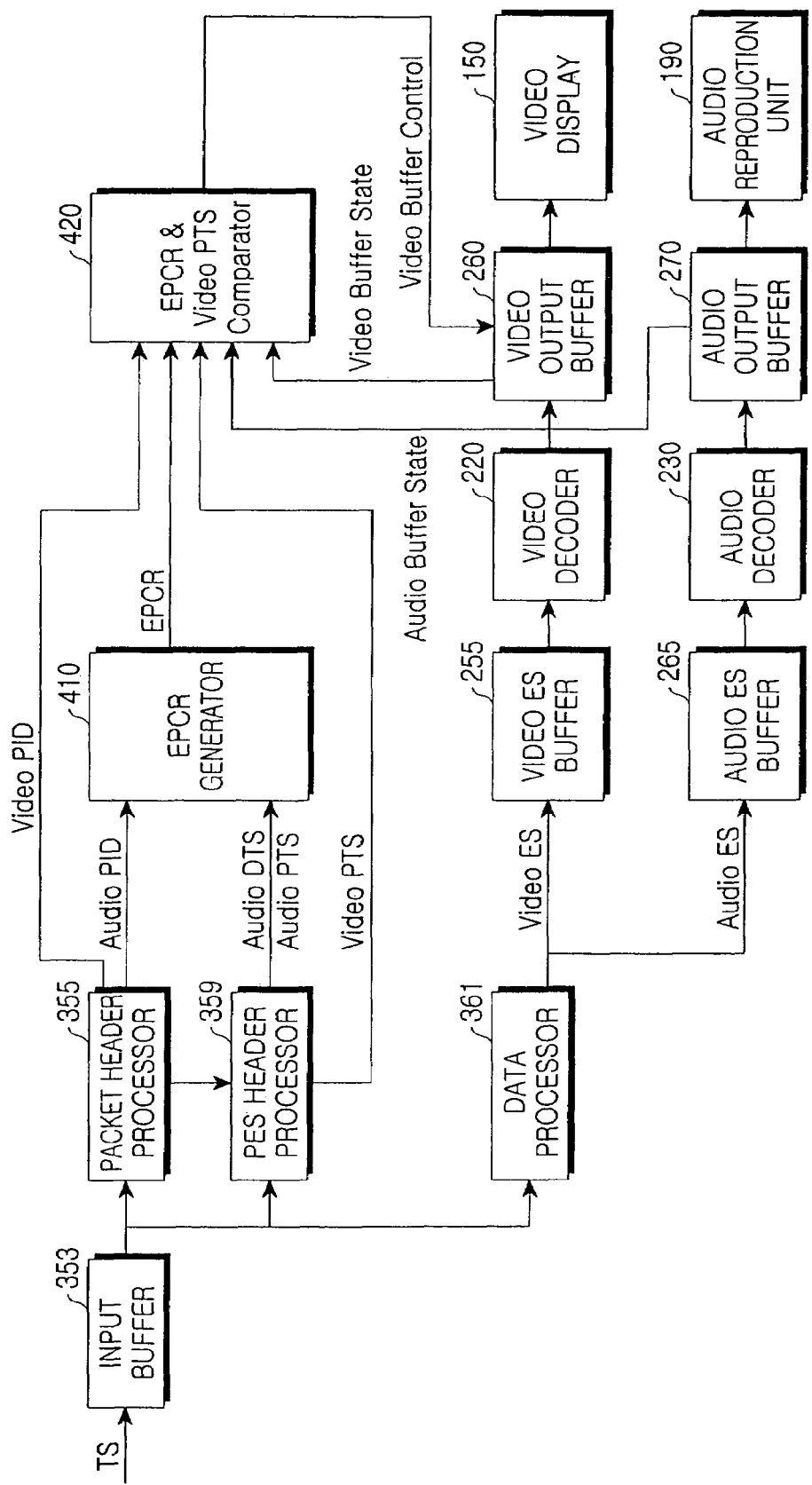
FIG. 18 is a block diagram illustrating a structure of controlling outputting timing of a video decoding signal by comparing an EPCR and a VPTS with each other, according to an exemplary embodiment of the present invention.
Figure 19A:
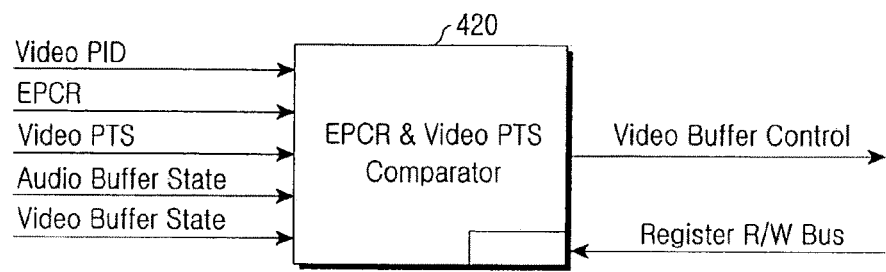
FIGS. 19a and 19b are views illustrating a structure of a comparator for generating a signal controlling outputting timing of a video decoding signal in FIG. 18.
Figure 19B:
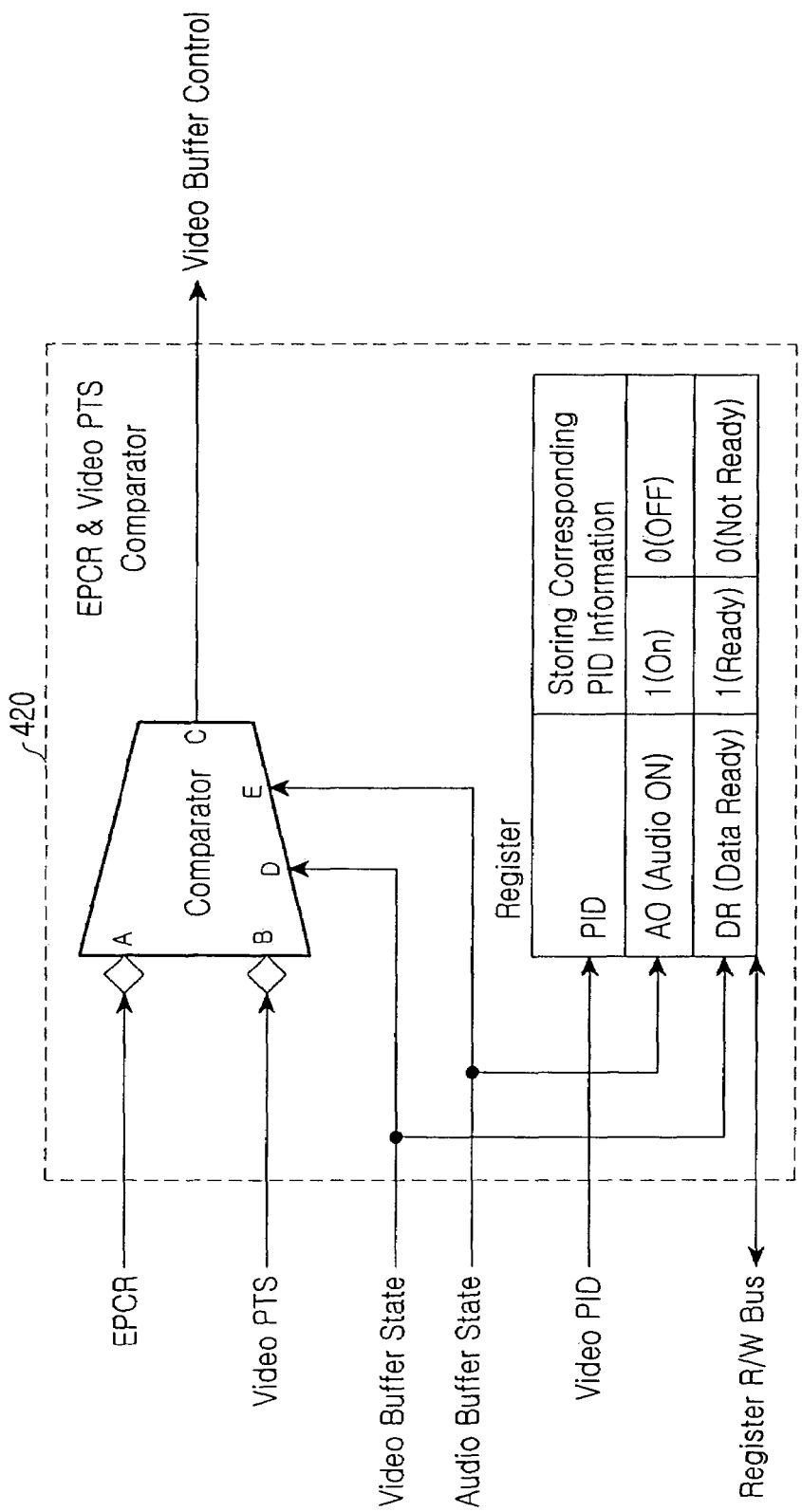
Figure 20:
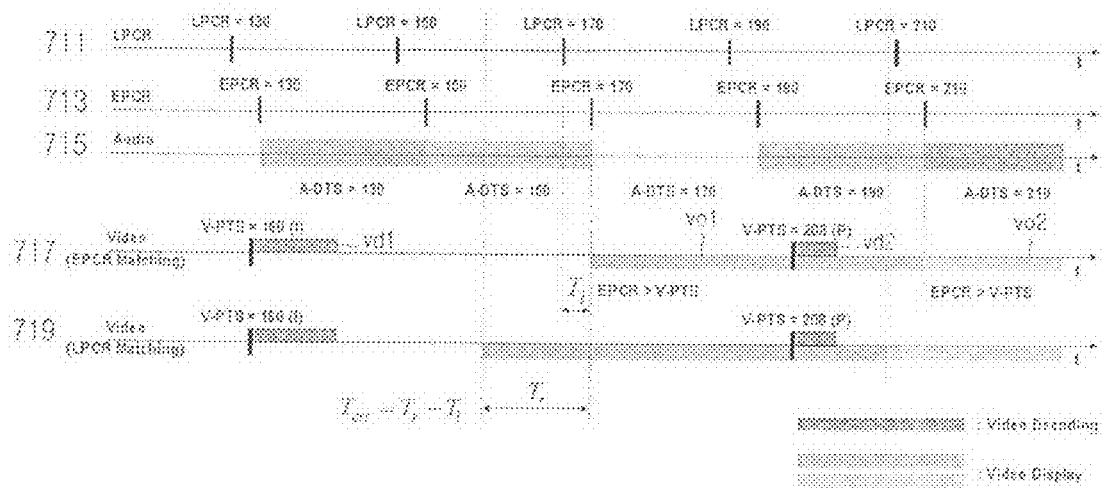
FIG. 20 is a timing chart illustrating timing for controlling outputting timing of a video decoding signal by comparing an EPCR and a VPTS with each other, according to an exemplary embodiment of the present invention.
Figure 21:
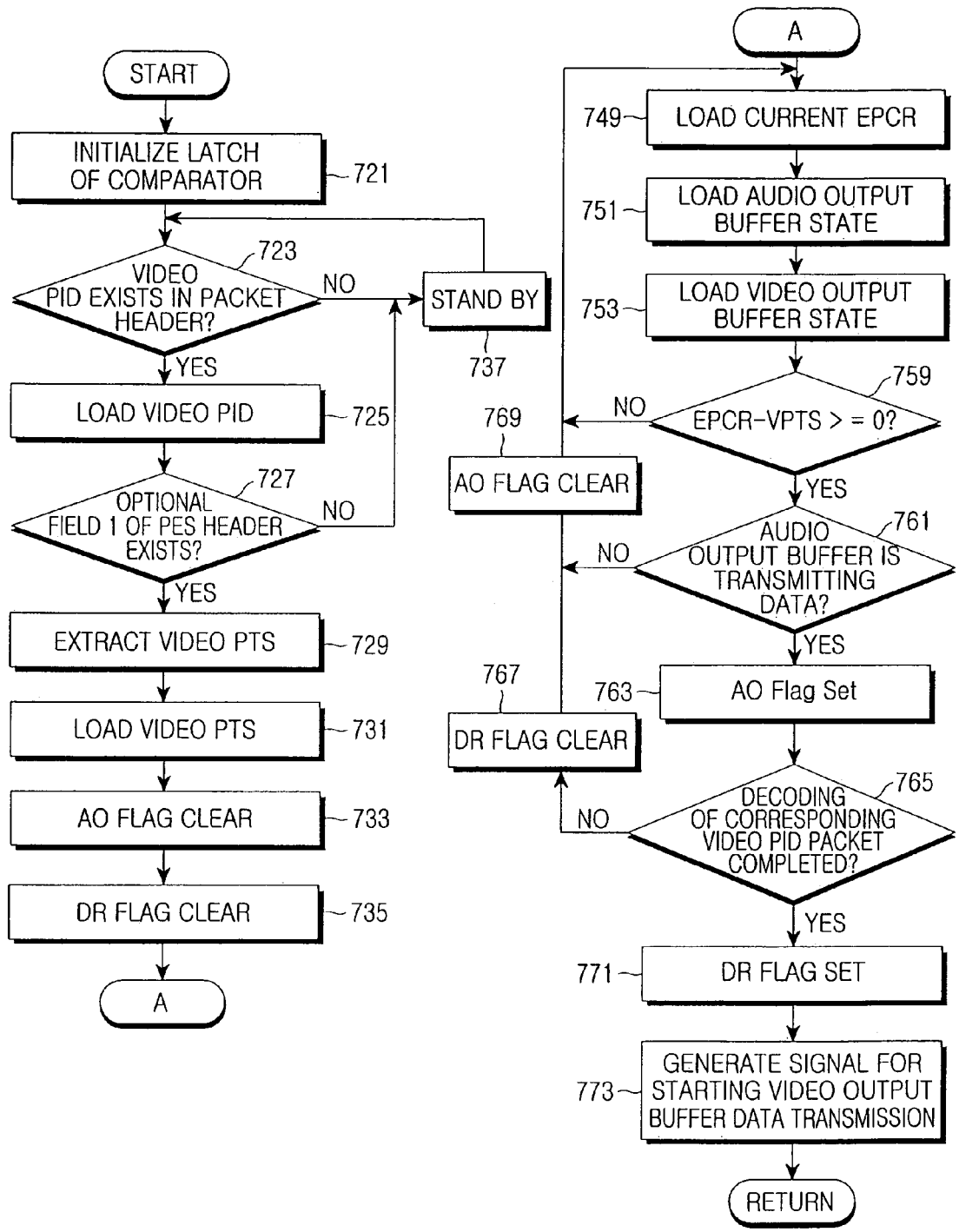
FIG. 21 is a flowchart illustrating a procedure of generating a PTS of a video decoding signal by comparing an EPCR and a VPTS with each other, according to an exemplary embodiment of the present invention.

First, an exemplary embodiment of the present invention will be described with reference to FIGS. 18 to 21, in which FIG. 18 illustrates a control structure of audio and video decoders, FIGS. 19a and 19b illustrate a structure of the comparator 420, FIG. 20 illustrates operative timing, and FIG. 21 illustrates audio and video decoding control procedures.

In an exemplary implementation, if a packet is inputted into the input buffer 353, the packet header processor 355 analyzes whether the packet has a preset PID. At this time, if a preset audio PID is detected, the packet header processor 355 informs the EPCR generator 410 of this detection, and if a preset video PID is detected, the packet header processor 355 informs the comparator 420 of this detection.

If the audio or video PID is detected in this way, the PES header processor 359 determines whether the currently inputted packet includes a frame header. If the packet includes the frame header, the PES header processor 359 applies an ADTS or APTS to the EPCR generator 410 when the packet is an audio packet according to the type of packet, and applies a VPTS to the comparator 420 when the packet is a video packet according to the type of packet. At this time, the EPCR generator 410 stores the inputted ADTS or APTS, and then generates the stored ADTS or APTS into an EPCR. Also, the comparator 420 inputs the EPCR. If the packet having the preset PID includes the VPTS in the frame header, the comparator 420 receives the VPTS, and then compares the VPTS with the EPCR to generate a decoding control signal for controlling the output buffer 260. Also, if the received packet is video or audio data, the data processor 361 generates the packet into a video ES or an audio ES to buffer the video or audio ES in the corresponding video or audio buffer 255 or 265.

At this time, if video data of frame size is buffered in the video buffer 255, the video decoder 220 decodes the video data to buffer the decoded video data in the video output buffer 260. The video output buffer 260 outputs the decoded video data to the display 150 by means of the video outputting control signal outputted from the comparator 420. Also, the audio decoder 230 decodes the audio data buffered in the audio buffer 265 to output the decoded audio data to the audio output buffer 270. An audio reproduction unit 190 reproduces the audio data buffered in the audio output buffer 270. At this time, the decoding time point of the audio decoder 230 or the outputting of the audio output buffer 270 can be controlled in a case of audio. That is, in a case of using the ADTS, the audio decoder 230 can be controlled such that its decoding time point is controlled. In a case of using the APTS, the audio decoder 230 decodes data buffered in the audio buffer 265, and also can control the outputting time point of the audio output buffer 270.

FIGS. 19a and 19b illustrate a structure of the comparator 420.

Referring to FIGS. 19a and 19b, the comparator 420 inputs a video PID, an EPCR, a VPTS, a state value of the video output buffer and, a state value of the audio output buffer. In an exemplary implementation, the state values of the video and audio output buffers are used as an enable control signal of the comparator 420. That is, if the audio output buffer 270 is in an on-state, and the video output buffer 260 is in a ready-state, the comparator 420 compares the VPTS with the EPCR to generate an outputting control signal for the video output buffer 260 when the EPCR has a greater value than that of the VPTS.

As shown in FIG. 20, reference numeral "711" indicates timing for generating a LPCR by using a PCR, and reference numeral "719" indicates video decoding timing and video presentation timing in a case of using the LPCR. However, in an exemplary implementation, the EPCR is generated using an ADTS or APTS, and reference numeral "713" indicates generation timing of the EPCR. At this time, in a case of audio, audio decoding timing and audio outputting timing are controlled by means of the ADTS or APTS, as indicated by reference numeral "715". Since the EPCR is generated using the ADTS or APTS, processing with no delay is possible in a case of the audio, as indicated by reference numeral "715".

However, video decoding control is affected by matching the VPTS with the EPCR, as indicted by reference numeral "717". That is, as represented in "717", when a video packet having VPTS 160 is received, the video decoder 220 immediately decodes video data to buffer the decoded video data in the video output buffer 260, as indicated by reference numeral "vd1". Also, the comparator 420 matches the VPTS 160 with the EPCR and, at a point of time when the EPCR value becomes greater the VPTS value, outputs the decoded video data buffered in the video output buffer 260 to present on the display 150. Since there is no EPCR 160 and there is EPCR 170, the video data buffered in the video output buffer 260, whose VPTS is 160, is outputted and presented at a point of time when the EPCR becomes 170, as indicated by reference numeral "vo1". If video data having VPTS 208 is received, the video decoder 220 decodes the received video data to store the decoded video data in the video output buffer 260, as indicated by reference numeral "vd2". Also, at a point of time when the EPCR value becomes greater than the VPTS value (that is, when the EPCR becomes 210), the comparator 420 outputs the decoded video data buffered in the video output buffer 260, as indicated by reference numeral "vo2".

As seen from FIG. 20, the decoding control method according to an exemplary embodiment of the present invention repeatedly performs an operation in which an EPCR is generated using an ADTS or APTS, audio decoding is controlled by means of the ADTS or APTS in a case of audio data, the video decoder 220 decodes and buffers inputted video data in a case of the video data, and a VPTS of the video data is matched with the EPCR to output the decoded and buffered video data at a point of time when the EPCR value becomes greater than the VPTS value.

FIG. 21 is a flowchart illustrating video and audio decoding control procedures according to an exemplary embodiment of the present invention.

Referring to FIG. 21, in step 721, the comparator 420 initializes a register value. If the packet header processor 355 does not detect a video PID of a packet header in step 723, the PES header processor 355 stands by for a next packet. If the packet header processor 355 detects a video PID of a packet header in step 723, the video PID is loaded into the comparator 420 in step 725. Also, if the PES header processor 359 verifies in step 727 that optional field 1 exists in a PES header, the PES header processor 359 extracts a VPTS from the optional field 1 in step 729, loads the VPTS into the comparator 420 in step 731, and clears a state value (AO flag) of the audio output buffer 270 and a state value (DR flag) of the video output buffer 260 in steps 733 and 735, respectively.

At this time, the EPCR generator 410 generates an EPCR, as indicated by reference numeral "713" in FIG. 20. Reference numeral "711" in FIG. 20 gives an example of an LPCR, which can be reproduced from an inputted PCR in a case of using an LPCR generator. As represented in "713", the EPCR has timing later than that of the LPCR, which is intended to show that there is delay by a time during which the EPCR is generated in the EPCR generator 410.

Then, the comparator 420 is loaded with the EPCR (as indicated by "713") outputted from the EPCR generator 410 in step 749, and is loaded with the state values of the audio output buffer 270 and the video output buffer 260 in steps 751 and 753, respectively. Thereafter, if the comparator 420 senses in step 759 that the EPCR value becomes greater than the VPTS value, in step 761, a determination is made as to whether the audio output buffer 270 is outputting audio data. If the audio data is not outputted, the AO flag is cleared in step 769. If the audio data is being outputted, the AO flag is set in step 763, and in step 765, a determination is made as to whether decoded video data is buffered in the video output buffer 260. If the decoding of the vide data has not been completed, the DR flag is cleared in step 767. If the decoding of the video data has been completed, the DR flag is set in step 771, and a video outputting control signal is generated in the video output buffer 260 in step 773. Also, the video output buffer 260 outputs the decoded video data of one frame to the display 150.

Secondly, an exemplary embodiment of the present invention will be described with reference to FIGS. 22 to 25, in which a VPTS for controlling a presentation time point of decoded video data is used as a signal for controlling a decoding time point of video data. That is, the VPTS is used as a VDTS in a situation where there is no VDTS, so the video decoder 220 performs a decoding operation by means of the VPTS, and the video output buffer 260 intactly outputs the video data decoded in the video decoder 220 to the display 150.

Figure 22:
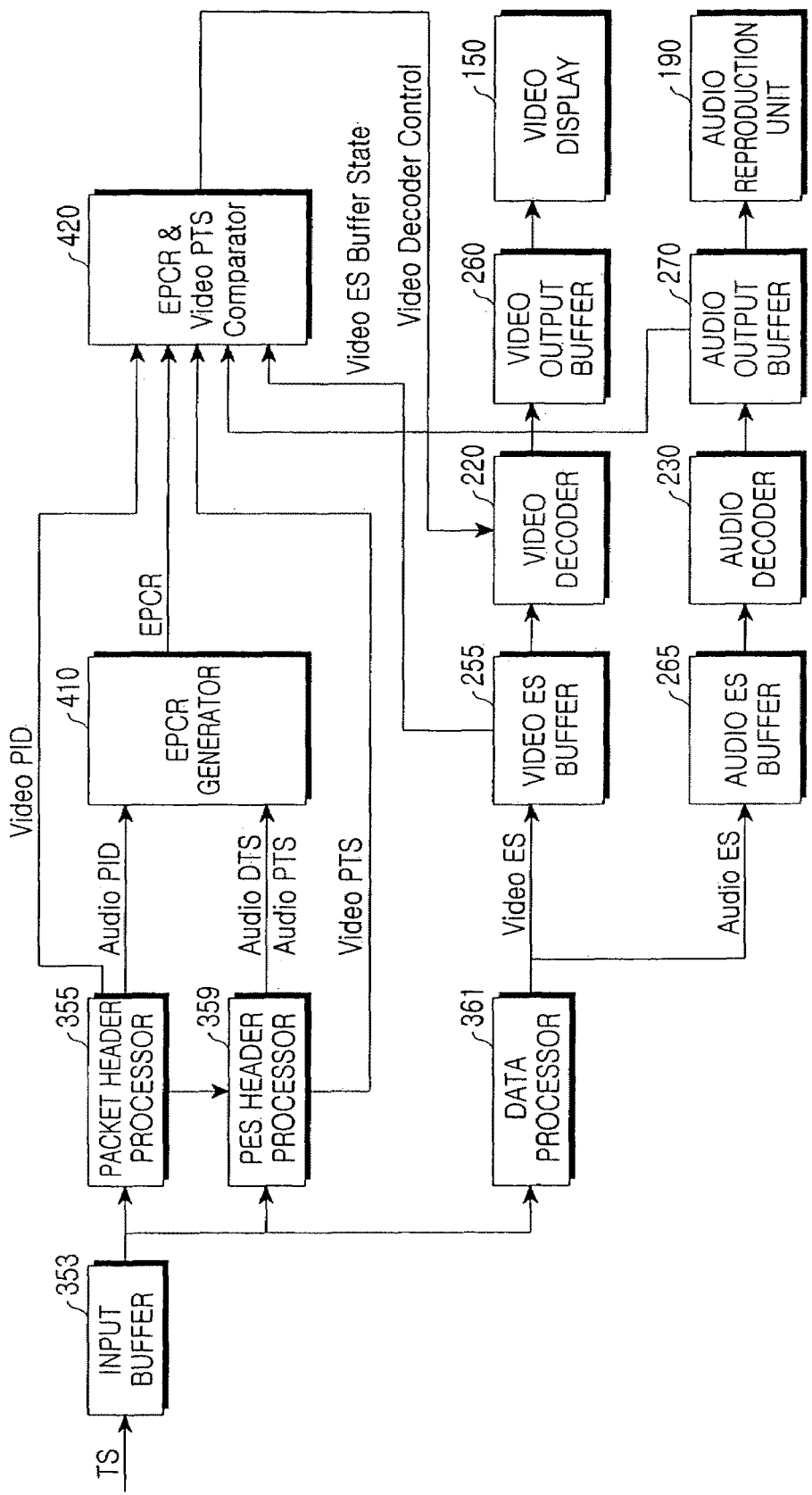
FIG. 22 is a block diagram illustrating a structure of controlling decoding start timing of a video decoder unit by comparing an EPCR and a VPTS with each other according to an exemplary embodiment of the present invention.
Figure 23A:
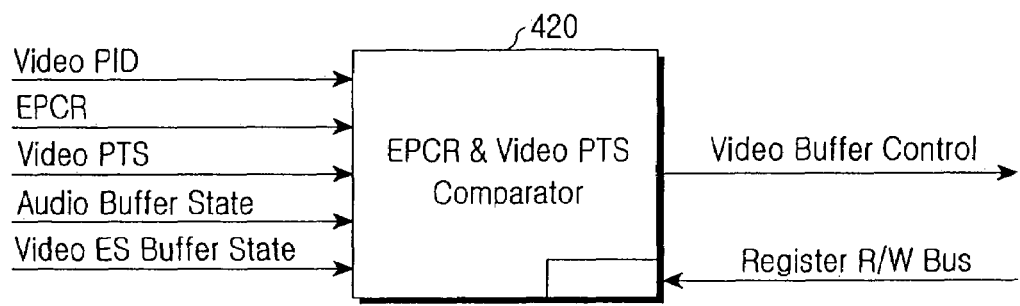
FIGS. 23a and 23b are views illustrating a structure of a comparator for generating a signal controlling decoding start timing of a video decoder in FIG. 22.
Figure 23B:
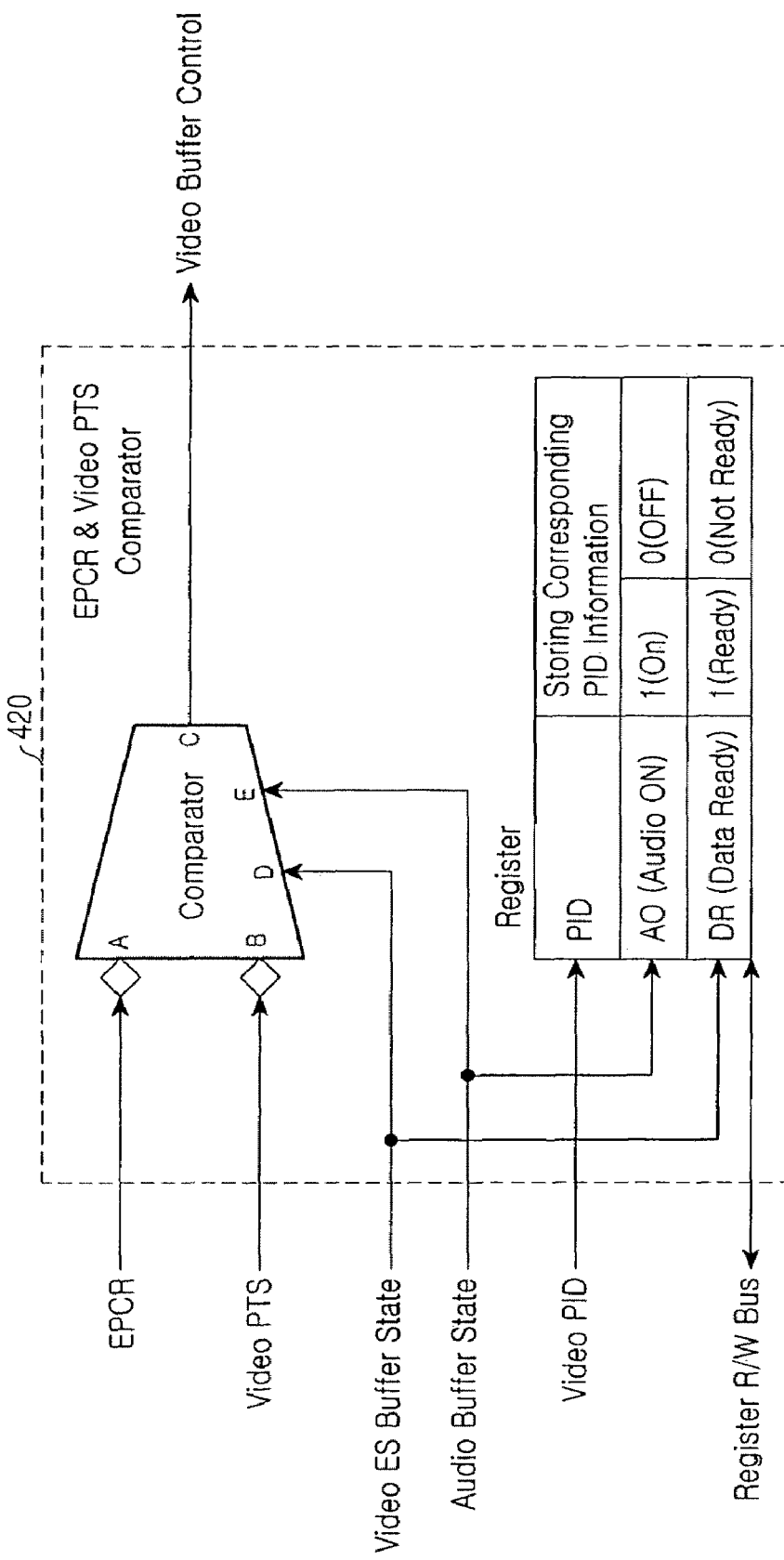
Figure 24:
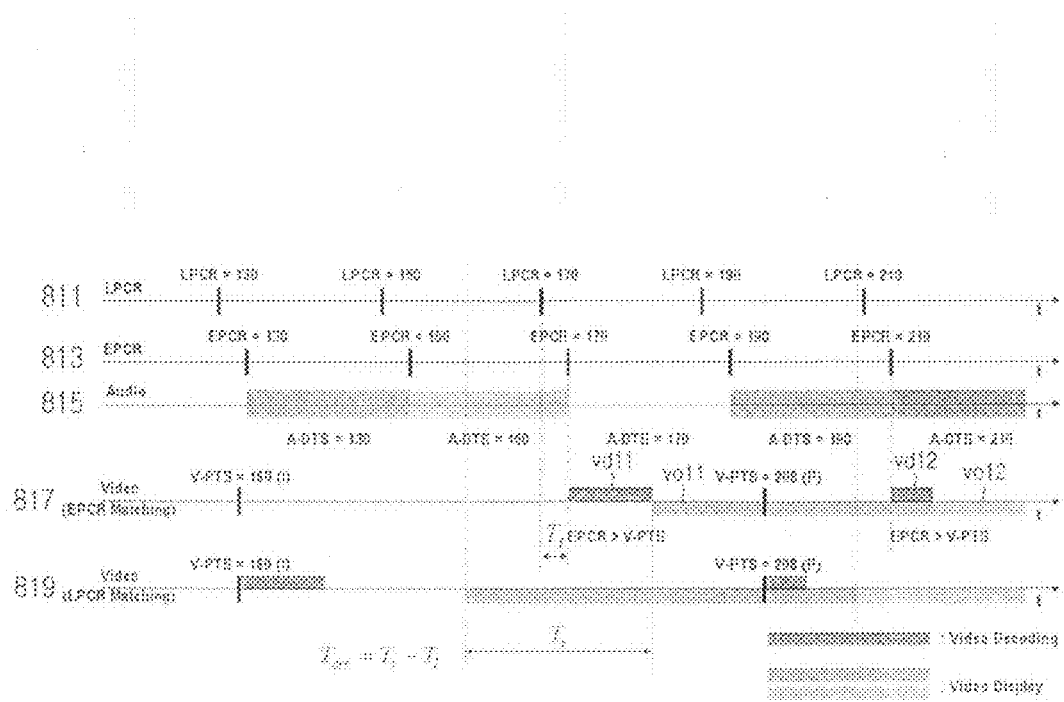
FIG. 24 is a timing chart illustrating timing for controlling decoding start timing of a video decoder by comparing an EPCR and a VPTS with each other, according to an exemplary embodiment of the present invention.
Figure 25:
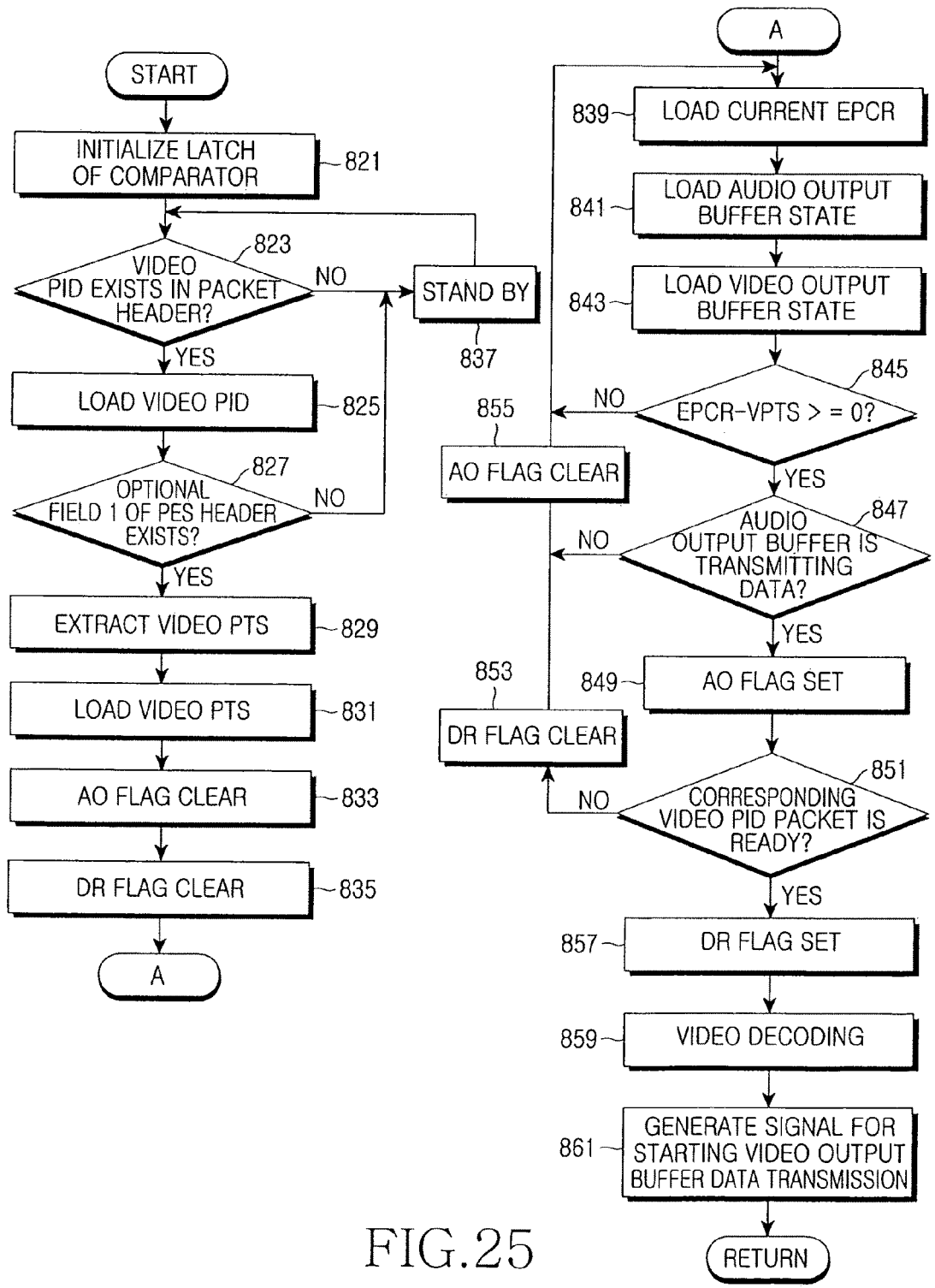
FIG. 25 is a flowchart illustrating a procedure of generating a DTS of a video decoder by comparing an EPCR and a VPTS with each other, according to an exemplary embodiment of the present invention.

According to an exemplary embodiment of the present invention, FIG. 22 illustrates a control structure of audio and video decoders, FIGS. 23a and 23b illustrate a structure of the comparator 420, FIG. 24 illustrates operative timing, and FIG. 25 illustrates audio and video decoding control procedures.

The exemplary embodiment of the present invention corresponds to a method in which a VPTS takes charge of the same function as the function of a VDTS. That is, the VPTS is used as a DTS of the video decoder 220, whereas the VPTS was used as a PTS of video data as described above. In other words, the VPTS is used as the VDTS. Thus, as shown in FIG. 22, its structure and operation are the same as those in FIG. 18, except for a construction of applying an output of the comparator 420 as the DTS of the video decoder 220. Also, the structure and the operation shown in FIGS. 23a and 23b are equivalent to those in FIGS. 19a and 19b.

As described above, the VPTS was used as a decoding control signal of the video decoder 220. Thus, as shown in FIG. 24, an EPCR is generated using an ADTS or APTS, and reference numeral "813" indicates generation timing of the EPCR. At this time, in a case of audio, audio decoding timing and audio outputting timing are controlled by means of the ADTS or APTS, as indicated by reference numeral "815". Since the EPCR is generated using the ADTS or APTS, processing with no delay is possible in a case of the audio, as indicated by reference numeral "815".

Video decoding control is affected by matching the VPTS with the EPCR, as indicted by reference numeral "817". That is, as represented in "817", when a video packet having VPTS160 is received, the video packet is buffered in the video ES buffer 255, as indicated by reference numeral "817". Also, the comparator 420 matches the VPTS160 with the EPCR and, at a point of time when the EPCR value becomes greater the VPTS value, generates a DTS in the video decoder 220. The video decoder 220 then inputs video data (in the unit of a frame) stored in the video ES buffer 255 to decode the video data. The decoded video data is outputted to the video output buffer 260, and the video output buffer 260 directly outputs the decoded video data to the display 150. That is, if video data, whose VPTS is 160, is inputted, the comparator 420 generates a video DTS in the video decoder 220 at a point of time when the EPCR (EPCR=170) value becomes greater than the VPTS value (VPTS=160), as indicated by "817". As a result, the video decoder 220 decodes the video data stored in the video ES buffer 255, as indicated by reference numeral "vd11" in "817". Also, the decoded video data is inputted into the video output buffer 260 and the video output buffer 260 outputs and presents the decoded video data to the display 150, as indicated by reference numeral "vo11" in "817".

Also, if video data having VPTS208 is inputted, the comparator 420 generates a video DTS in the video decoder 220 at a point of time when the EPCR (EPCR=210) value becomes greater than the VPTS value (VPTS=208). As a result, the video decoder 220 decodes the video data stored in the video ES buffer 255, as indicated by reference numeral "vd12" in "817". Also, the decoded video data is inputted into the video output buffer 260 and the video output buffer 260 outputs and presents the decoded video data to the display 150, as indicated by reference numeral "vo12" in "817".

As seen from FIG. 24, the decoding control method according to an exemplary embodiment of the present invention repeatedly performs an operation in which an EPCR is generated using an ADTS or APTS, audio decoding is controlled by means of the ADTS or APTS in audio data, video decoding is performed by matching the VPTS with the EPCR at a point of time when the EPCR value becomes greater than the VPTS value in the video data, and the decoded video data is outputted to the display 150. Thus, since decoding delay of video data may occur due to a difference between the VPTS value and the EPCR value, the size of the video ES buffer 255 may be set to appropriate size according to a correlation between the VPTS and the EPCR. In FIG. 24, reference numeral "811" indicates timing for generating a LPCR by using a PCR, and reference numeral "819" indicates video decoding and presentation timing in a case of using the LPCR.

In the second embodiment of the present invention, the method of comparing the VPTS with the EPCR to generate the DTS of the video decoder 220 is illustrated in FIGS. 23a and 23b, and its construction and operation are the same as those of the comparator 420 shown in FIGS. 19a and 19b. However, the DTS of the video decoder 220, which is generated through the construction in FIGS. 23a and 23b, is applied to the video decoder 220, as shown in FIG. 22. Thus, the video decoder 220 perform the video decoding operation at a point of time when the EPCR value becomes greater than the VPTS value, as indicated by "817" in FIG. 24.

FIG. 25 is a flowchart illustrating video and audio decoding control procedures according to an exemplary embodiment of the present invention.

In FIG. 25, operations in steps 821 to 843 of FIG. 25 are processed in the same manner as those in steps 721 to 753 of FIG. 21.

If the comparator 420 senses in step 845 that the EPCR value becomes equal to or greater than the VPTS value, in step 847, a determination is made as to whether the audio output buffer 270 is outputting audio data. If the audio data is not outputted, the AO flag is cleared in step 855. If the audio data is being outputted, the AO flag is set in step 849, and whether video data of frame size is buffered in the video ES buffer 255 is verified in step 851. If the vide data is not buffered in the video ES buffer 255, the DR flag is cleared in step 853. If the video data is buffered in the video ES buffer 255, the DR flag is set in step 857, the video decoder 220 operates to decode the video data stored in the video ES buffer 255 and to buffer the decoded video data in the video output buffer 260 in step 859, and the video output buffer 260 outputs the decoded video data of one frame to the display 150 in step 861.

Figure 26:
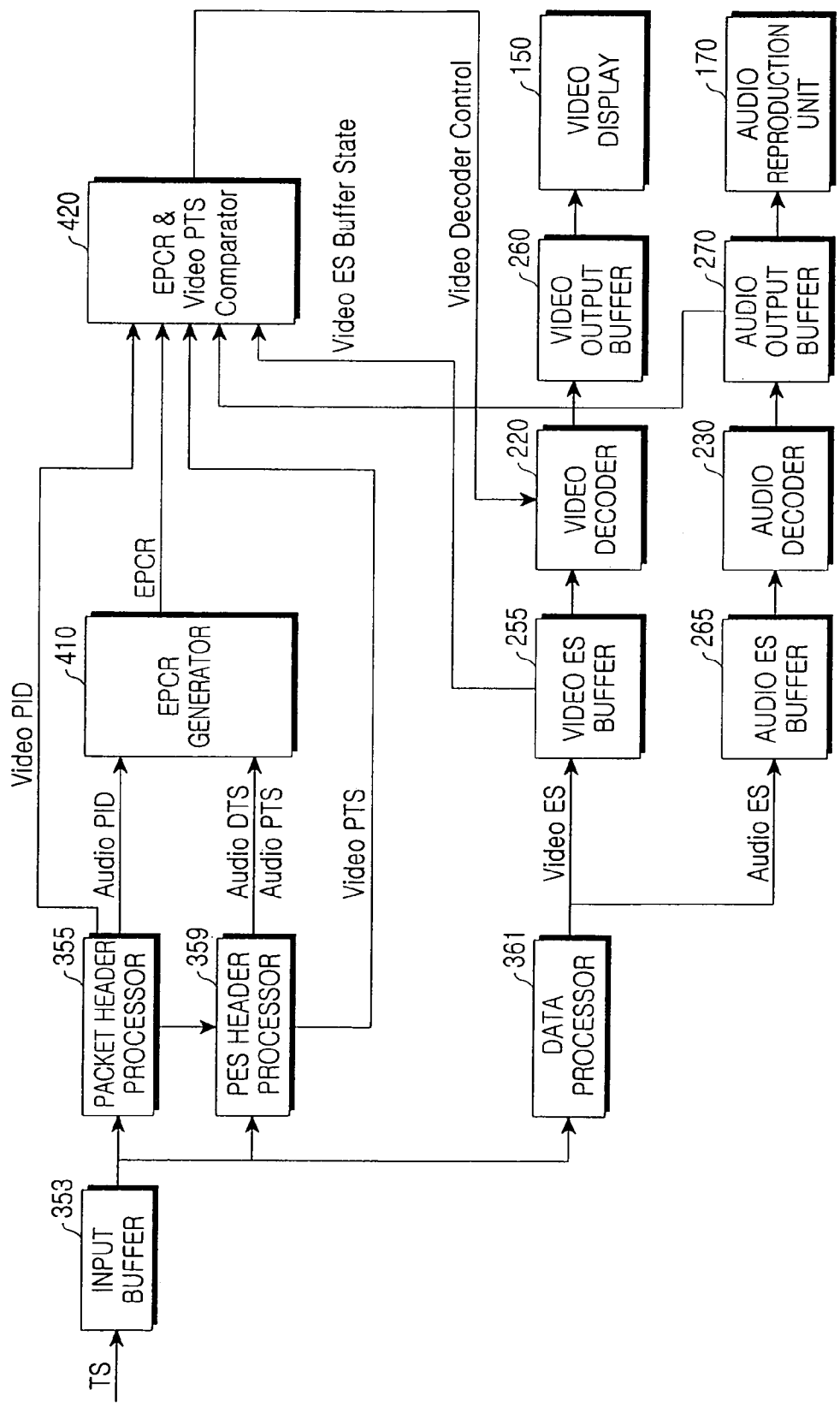
FIG. 26 is a block diagram illustrating a structure of controlling decoding start timing of a video decoder unit by comparing an EPCR and a VDTS with each other, according to an exemplary embodiment of the present invention.
Figure 27A:
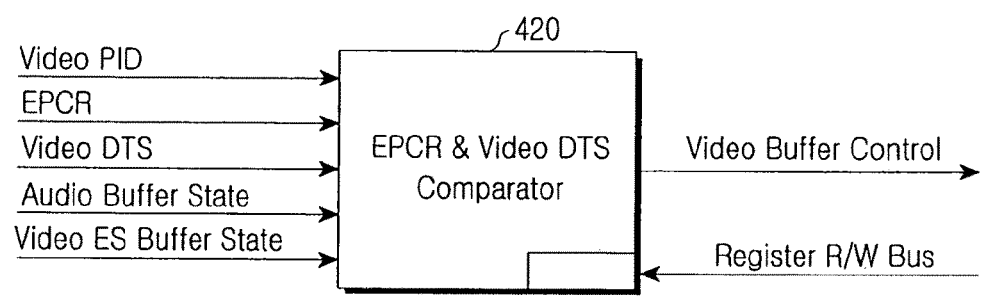
FIGS. 27a and 27b are views illustrating a structure of a comparator for generating a signal controlling decoding start timing of a video decoder in FIG. 26.
Figure 27B:
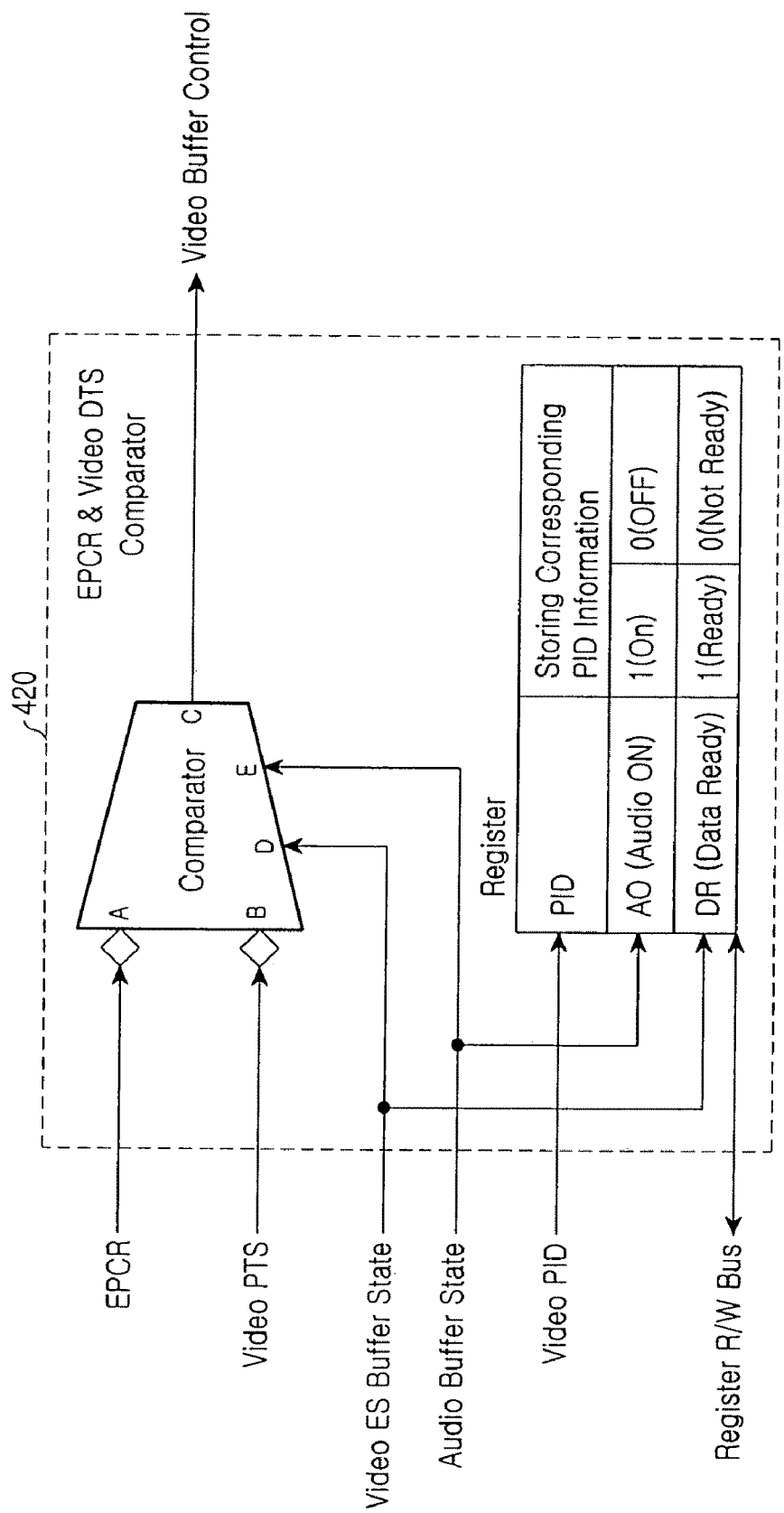
Figure 28:
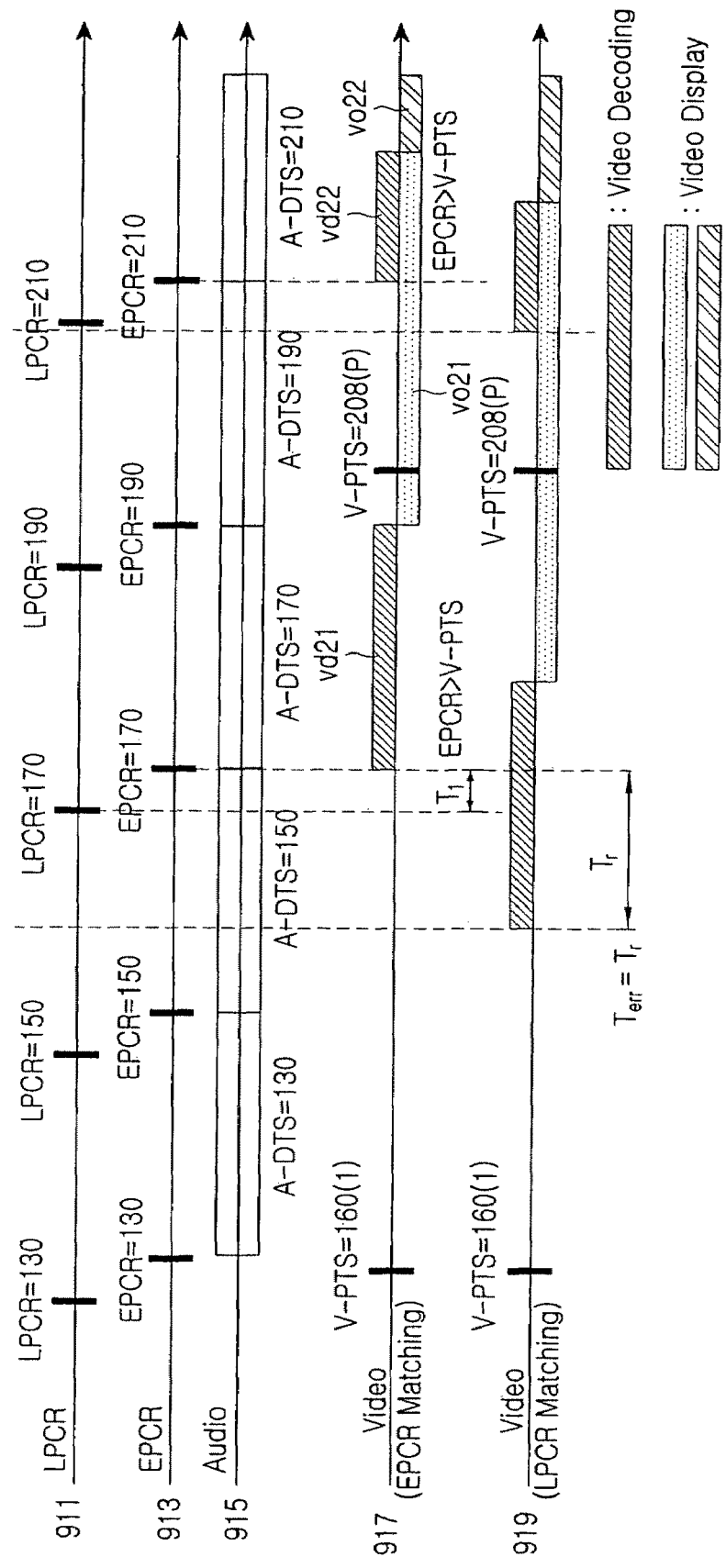
FIG. 28 is a timing chart illustrating timing for controlling decoding start timing of a video decoder by comparing an EPCR and a VDTS with each other, according to an exemplary embodiment of the present invention.
Figure 29:
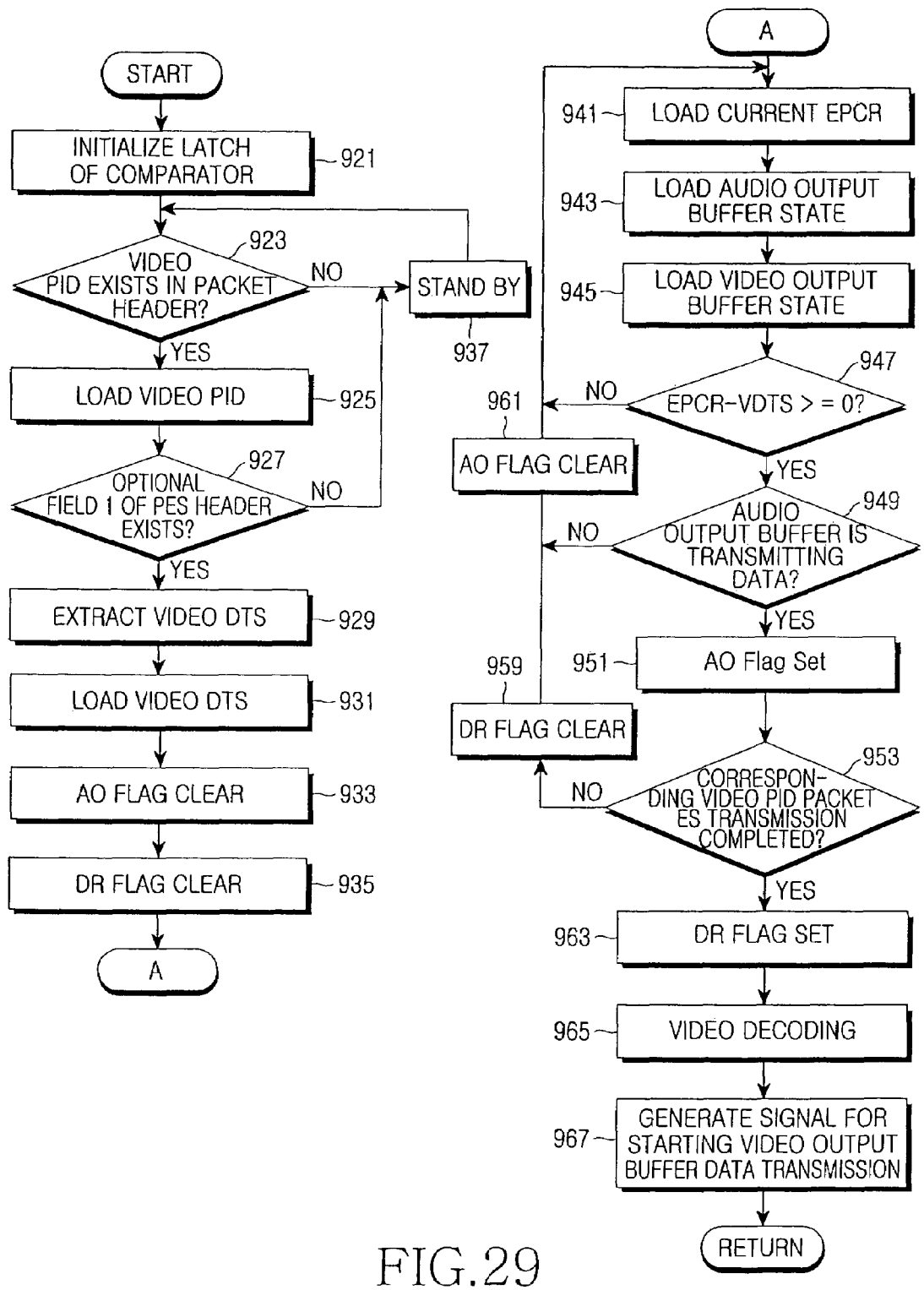
FIG. 29 is a flowchart illustrating a procedure of generating a DTS of a video decoder by comparing an EPCR and a VDTS with each other, according to an exemplary embodiment of the present invention.

Thirdly, an exemplary embodiment of the present invention will be described with reference to FIGS. 26 to 29, in which FIG. 26 illustrates a control structure of audio and video decoders, FIGS. 27a and 27b illustrate a structure of the comparator 420, FIG. 28 illustrates operative timing, and FIG. 29 illustrates audio and video decoding control procedures.

Referring to FIG. 26, the PES header processor 359 extracts a VDTS from a PES header to transfer the VDTS to the comparator 420, and the comparator 420 compares the VDTS with an EPCR to generate a DTS in the video decoder 220 at a point of time when the EPCR value becomes greater than the VDTS value. Except for such a feature, the construction and the operation of FIG. 26 are the same as those shown in FIG. 22.

As state above, the VDTS is used as a decoding control signal of the video decoder 220. First, the EPCR generator 410 generates an EPCR by using an ADTS or APTS, and reference numeral "913" indicates generation timing of the EPCR. At this time, in a case of audio, audio decoding timing and audio outputting timing are controlled by the ADTS or APTS, as indicated by reference numeral "915". Since the EPCR is generated using the ADTS or APTS, processing with no delay is possible in a case of the audio, as indicated by reference numeral "915".

Decoding time point control of the video decoder 220 is effected by matching the VDTS with the EPCR, as indicted by reference numeral "917". That is, as represented in "917", when a video packet having VDTS160 is received, the video packet is buffered in the video ES buffer 255, as indicated by reference numeral "917". Also, the comparator 420 matches the VPTS160 with the EPCR and, at a point of time when the EPCR value becomes greater the VDTS value, generates a DTS in the video decoder 220. The video decoder 220 then inputs video data (in the unit of a frame) stored in the video ES buffer 255 to decode the video data. The decoded video data is outputted to the video output buffer 260, and the video output buffer 260 directly outputs the decoded video data to the display 150. That is, if video data, whose VDTS is 160, is inputted, the comparator 420 generates a video DTS in the video decoder 220 at a point of time when the EPCR (EPCR=170) value becomes greater than the VDTS value (VDTS=160), as indicated by "917". As a result of this, the video decoder 220 decodes the video data stored in the video ES buffer 255, as indicated by reference numeral "vd21" in "917". Also, the decoded video data is inputted into the video output buffer 260, and the video output buffer 260 outputs and presents the decoded video data to the display 150, as indicated by reference numeral "vo21" in "917".

Also, if video data having VDTS208 is inputted, the comparator 420 generates a video DTS in the video decoder 220 at a point of time when the EPCR (EPCR=210) value becomes greater than the VDTS value (VDTS=208). As a result, the video decoder 220 decodes the video data stored in the video ES buffer 255, as indicated by reference numeral "vd22" in "917". Also, the decoded video data is inputted into the video output buffer 260, and the video output buffer 260 outputs and presents the decoded video data to the display 150, as indicated by reference numeral "vo22" in "917".

As seen from FIG. 28, the decoding control method according to the third embodiment of the present invention repeatedly performs an operation in which an EPCR is generated using an ADTS or APTS, audio decoding is controlled by means of the ADTS or APTS in a case of audio data, video decoding is performed by matching the VDTS with the EPCR at a point of time when the EPCR value becomes greater than the VDTS value in a case of the video data, and the decoded video data is outputted to the display 150. Thus, since decoding delay of video data may occur due to a difference between the VDTS value and the EPCR value, it is preferred that the size of the video ES buffer 255 may be set to an appropriate size according to a correlation between the VDTS and the EPCR. In FIG. 28, reference numeral "911" indicates timing for generating a LPCR by using a PCR, and reference numeral "919" indicates video decoding and presentation timing in a case of using the LPCR.

In an exemplary embodiment of the present invention, the method of comparing the VPTS with the EPCR to generate the DTS of the video decoder 220 is illustrated in FIGS. 27a and 27b, and its construction and operation are the same as those of the comparator 420 shown in FIGS. 19a and 19b. However, the DTS of the video decoder 220, which is generated through the construction in FIGS. 27a and 27b, is applied to the video decoder 220, as shown in FIG. 26. Thus, the video decoder 220 perform the video decoding operation at a point of time when the EPCR value becomes greater than the VDTS value, as indicated by "917" in FIG. 28.

In an exemplary embodiment of the present invention with reference to FIG. 29, operations in steps 921 to 945 of FIG. 29 are processed in the same manner as in steps 821 to 845 of FIG. 25.

If the comparator 420 senses in step 947 that the EPCR value becomes equal to or greater than the VPTS value, in step 949, a determination is made as to whether the audio output buffer 270 is outputting audio data. If the audio data is not outputted, the AO flag is cleared in step 961. If the audio data is being outputted, the AO flag is set in step 951, and whether video data of frame size is buffered in the video ES buffer 255 is determined in step 953. If the video data is not buffered in the video ES buffer 255, the DR flag is cleared in step 959. If the video data is buffered in the video ES buffer 255, the DR flag is set in step 963, the video decoder 220 operates to decode the video data stored in the video ES buffer 255 and to buffer the decoded video data in the video output buffer 260 in step 965, and the video output buffer 260 outputs the decoded video data of one frame to the display 150 in step 967.

Figure 30:
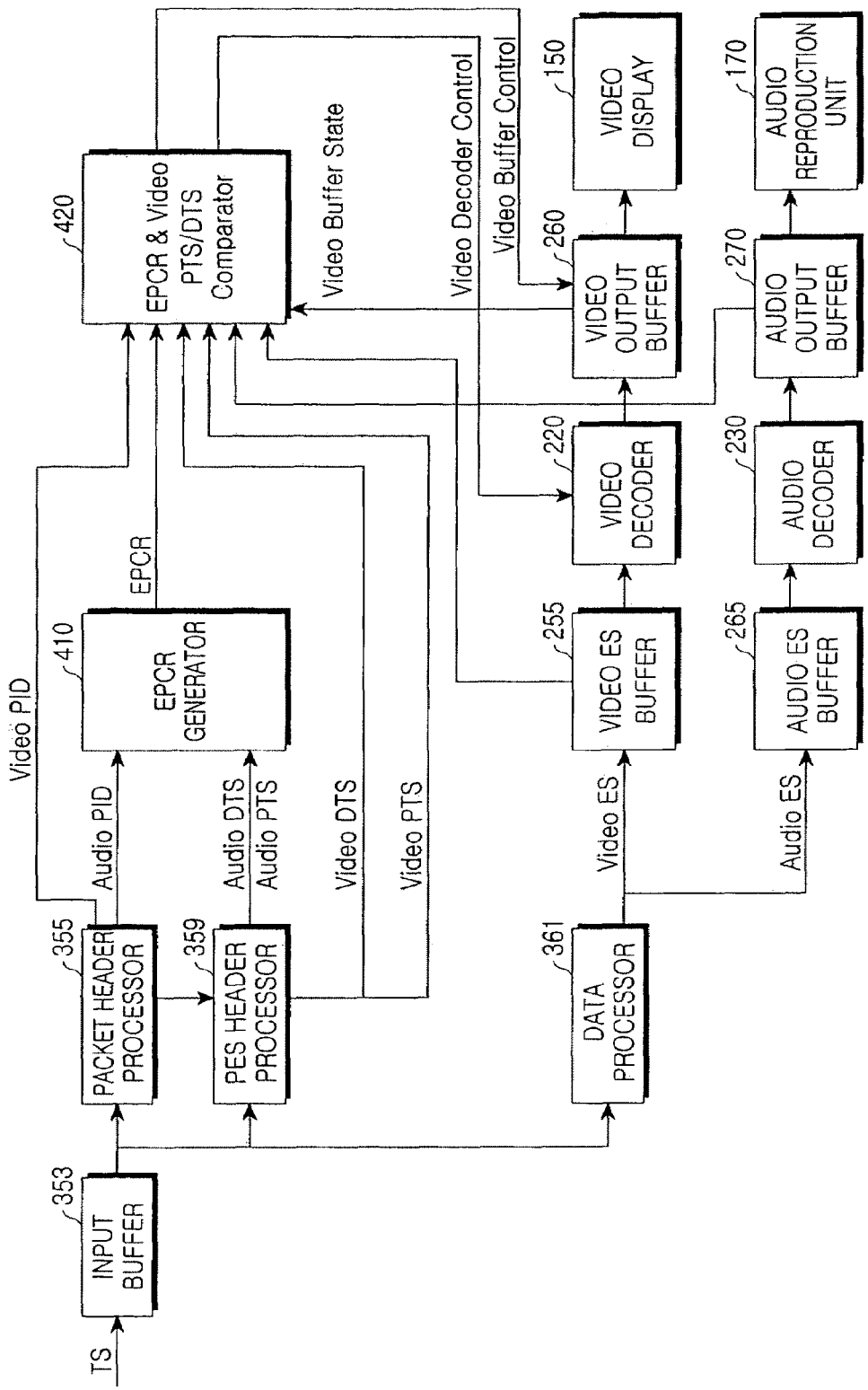
FIG. 30 is a block diagram illustrating a structure of controlling outputting timing of a video decoding signal by comparing an EPCR and a VDTS with each other, according to an exemplary embodiment of the present invention.
Figure 31A:
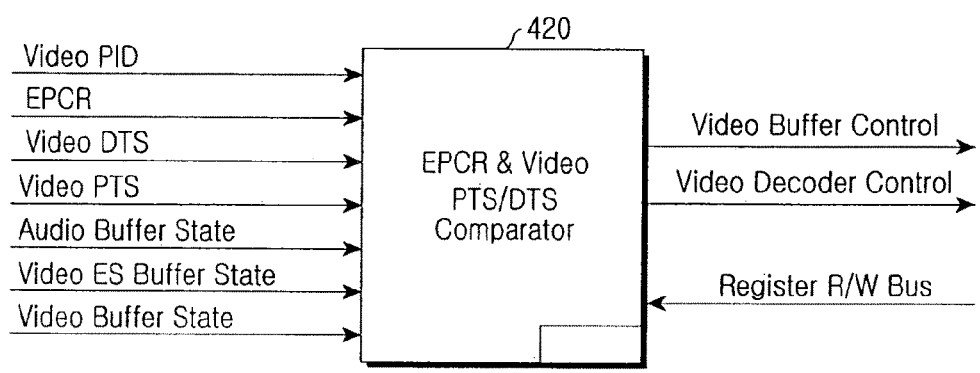
FIGS. 31a and 31b are views illustrating a structure of a comparator for generating a signal controlling outputting timing of a video decoding signal in FIG. 30.
Figure 31B:
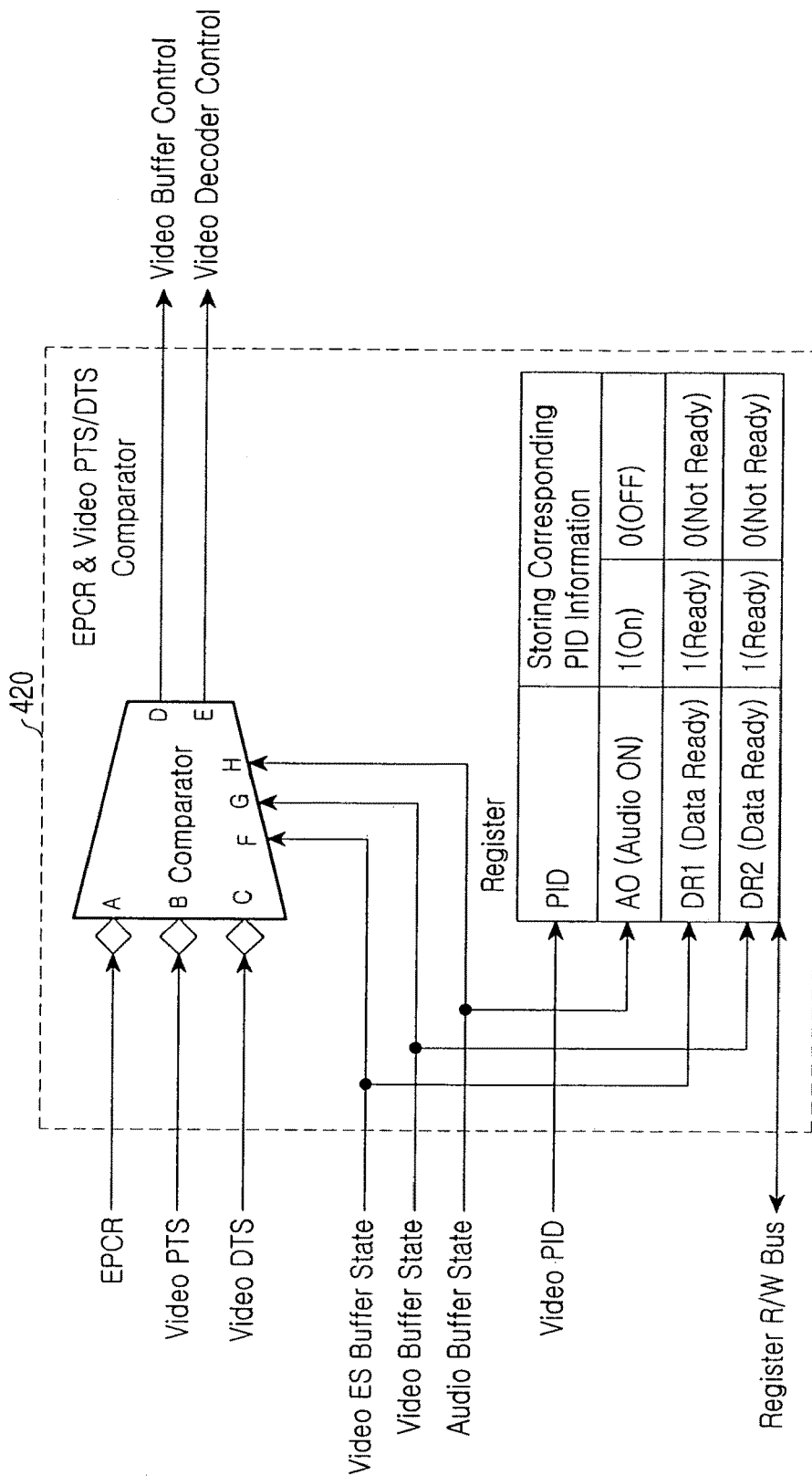
Figure 32:
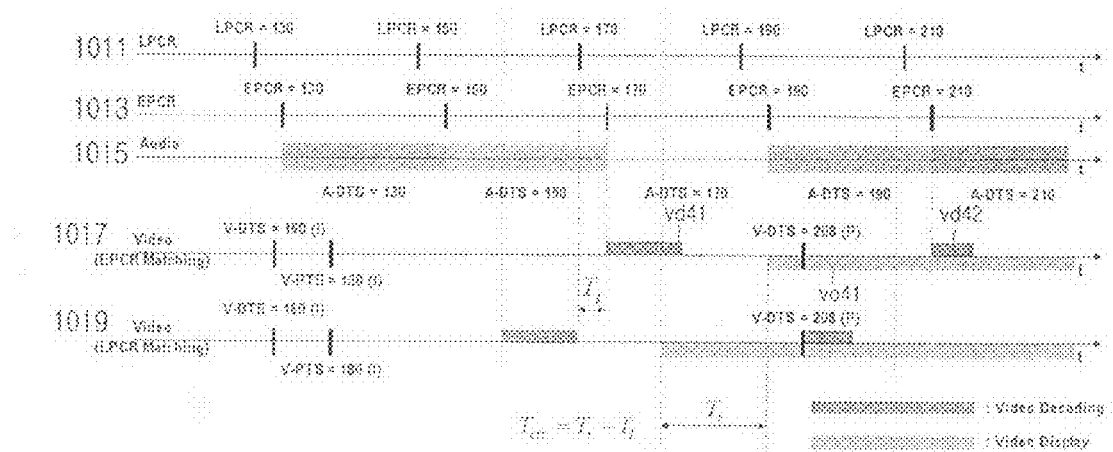
FIG. 32 is a timing chart illustrating timing for controlling outputting timing of a video decoding signal by comparing an EPCR and a VDTS with each other, according to an exemplary embodiment of the present invention.

Fourthly, an exemplary embodiment of the present invention will be described with reference to FIGS. 30 to 33, in which FIG. 30 illustrates a control structure of audio and video decoders, FIGS. 31a and 31b illustrate a structure of the comparator 420, FIG. 32 illustrates operative timing, and FIG. 33 illustrates audio and video decoding control procedures.

Referring to FIG. 30, in an exemplary embodiment of the present invention, the PES header processor 359 extracts a VDTS and a VPTS from a PES header to transfer the VDTS and the VPTS to the comparator 420. The comparator 420 compares the VDTS with an EPCR to generate a DTS in the video decoder 220 at a point of time when the EPCR value becomes greater than the VDTS value, and compares the VPTS with the EPCR to generate a PTS in the video output buffer 260 at a point of time when the EPCR value becomes greater than the VPTS value. Except for such a feature, the construction and the operation in FIG. 30 are the same as those of FIGS. 18, 22 and 26.

As stated above, the VDTS is used as a DTS signal of the video decoder 220, and the VPTS is used as a PTS of the video output buffer 260. First, the EPCR generator 410 generates an EPCR by using an ADTS or APTS, and reference numeral "1013" in FIG. 32 indicates generation timing of the EPCR. At this time, in a case of audio, audio decoding timing and audio outputting timing are controlled by means of the ADTS or APTS, as indicated by reference numeral "1015". Since the EPCR is generated using the ADTS or APTS, processing with no delay is possible in a case of the audio, as indicated by reference numeral "1015".

Decoding time point control and decoding outputting time point control of the video decoder 220 are affected by matching the VDTS and the VPTS with the EPCR, as indicted by reference numeral "1017". That is, as represented in "1017", when a video packet having VDTS160 and VPTS180 is received, the video packet is buffered in the video ES buffer 255, as indicated by reference numeral "1017". Also, the comparator 420 having a structure shown in FIGS. 31a and 31b matches the VDTS 160 with the EPCR and, at a point of time when the EPCR value (EPCR=170) becomes greater than the VDTS value, generates a DTS in the video decoder 220. The video decoder 220 then inputs video data (in the unit of a frame) stored in the video ES buffer 255 to decode the video data, as indicated by reference numeral "vd41", and the decoded video data is buffered in the video output buffer 260. Also, the comparator 420 matches the VPTS 180 with the EPCR and, at a point of time when the EPCR value (EPCR=190) becomes greater than the VPTS value, generates a PTS in the video output buffer 260. The video output buffer 260 then outputs the decoded video data buffered to the display 150, as indicated by reference numeral "vd41" in "1017".

Also, if video data having VDTS208 is inputted, the comparator 420 generates a video DTS in the video decoder 220 at a point of time when the EPCR (EPCR=210) value becomes greater than the VDTS value (VDTS=208). As a result, the video decoder 220 decodes the video data stored in the video ES buffer 255, as indicated by reference numeral "vd42" in "1017". Also, the decoded video data is inputted into the video output buffer 260 and the video output buffer 260 outputs and presents the decoded video data to the display 150 by means of a VDTS signal (not shown). Reference numeral "1011" in FIG. 32 gives indicates timing for generating a LPCR, and reference numeral "1019" indicates video decoding and presentation timing using the LPCR.

Figure 33A:
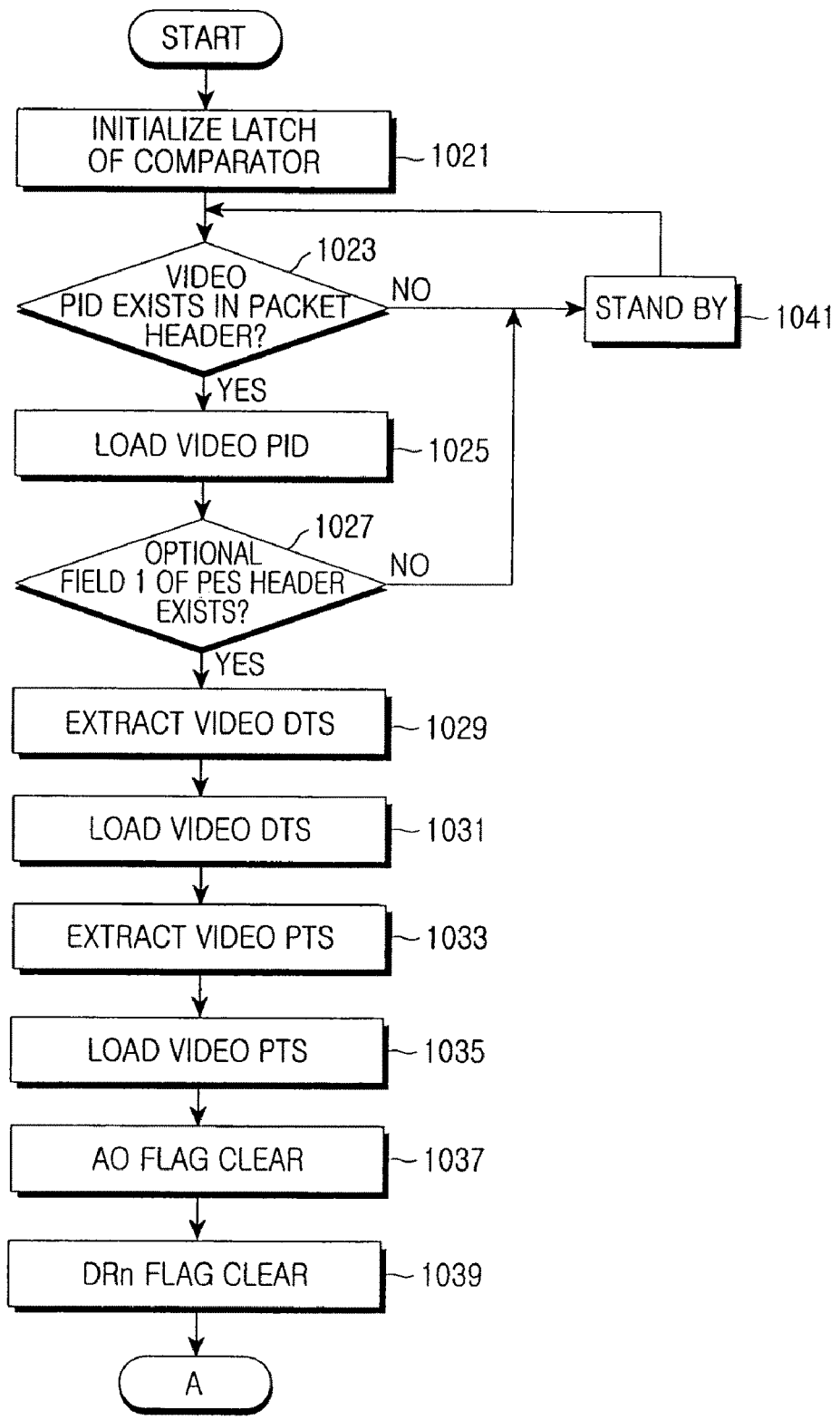
FIGS. 33a and 33b are flowcharts illustrating a procedure of generating a PTS of a video decoding signal by comparing an EPCR and a VDTS with each other according to an exemplary embodiment of the present invention.
Figure 33B:
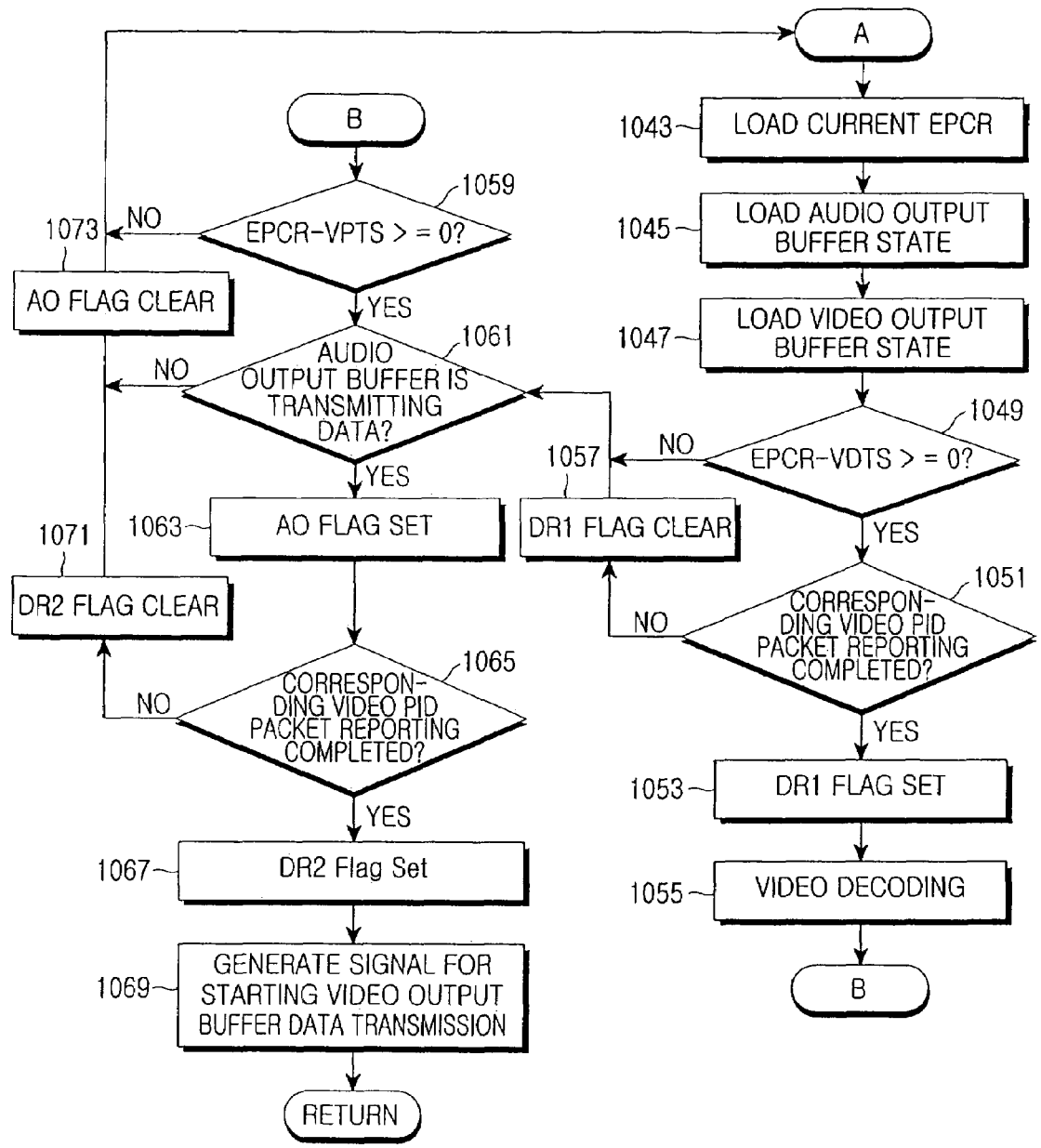

FIGS. 33a and 33b are flowcharts illustrating video and audio decoding procedures according to an exemplary embodiment of the present invention. As stated above, a method of controlling a decoding time point and a presentation time point of video are used by using both a VDTS and a VPTS.

Referring to FIG. 33a, steps 1021 to 1039 in FIG. 33 are similar to steps 721 to 743 in FIG. 21. However, in FIG. 33a, both the VDTS and the VPTS included in the inputted packet data are all extracted and stored while steps 1029 to 1035 are performed. Both the VDTS and the VPTS are all extracted because a decoding start time point of the video decoder 220 is controlled by the VDTS, and an outputting time point of the video output buffer 260 is controlled by the VPTS.

Thereafter, the video decoder 220 is controlled to decode video data buffered in the video ES buffer 255 by performing steps 1043 to 1055 in FIG. 33b at a point of time when the EPCR value becomes greater than the VDTS value, and the video output buffer 260 is controlled to output the decoded video data by performing steps 1059 to 1069 at a point of time when audio data is outputted. Steps 1043 to 1055 for decoding the video are similar to steps 941 to 965 in FIG. 29. In steps 1043 to 1055, whether to output the audio data is not determined when the video data is decoded. This is because the outputting time point of the decoded video data is controlled using the VPTS. Also, steps 1059 to 1069 for outputting the decoded video data are similar to steps 759 to 773 in FIG. 21. At this time, verifying whether to output the audio data at the control of the outputting time point of the decoded video data aims to make the output of the audio data coincident with an image picture presented on the display 150.

As stated above, an ADTS or APTS is used as a DTS of audio data or a PTS of decoded audio data and simultaneously is used as an EPCR for controlling decoding timing of video data. Also, the EPCR is matched with a VDTS and/or a VPTS to generate a DTS and/or a PTS of video data. Although exemplary embodiments have been described above on the assumption that the VDTS and/or the VPTS are/is used by way of example, an interpolated VDTS and/or an interpolated VPTS can be generated by using the interpolator 430 as shown in FIG. 15d at a point of time when a video frame is inputted. That is, inputted video data is buffered in the video input buffer 255 or decoded video data is buffered in the video output buffer 260 until the EPCR value (that is, the ADTS or APTS value) becomes greater than the VDTS or VPTS value. Thus, when video decoding starts or the decoded video data is outputted, it is probable that a plurality of video frames must be processed. This is because the VDTS and/or the VPTS is not generated in every frame, but may be generated in a cycle of a plurality of video frames. Therefore, if the interpolator 430 is used, an interpolated VDTS and/or an interpolated VPTS can be generated in each corresponding video frame interval. By virtue of this, the VDTS and/or VPTS can be compared with the EPCR value so as to control the decoding of video data in every interval in which a video frame exists. Consequently, by using the interpolated VDTS and/or VPTS, a decoding start time point or a presentation time point can be more precisely controlled.

In the exemplary embodiments of the present invention described above, using one decoder has been described by way of example. However, portable terminals with a DVB reception function are expected to enable a user to see and listen to broadcasting received over a plurality of channels. That is, image pictures received over two or more broadcast channels can be displayed on the display 150. It is also expected that video data and audio data can be received and reproduced over different channels. That is, an image signal of a specific broadcast channel can be reproduced and displayed while an audio signal such as music is reproduced by a speaker. In this case, decoders capable of audio data and/or video data received over the respective selected channels and synchronization controller units for synchronizing the data of the respective decoders must be provided. Also, each synchronization controller unit must be able to generate an EPCR by using an ADTS or APTS extracted from each channel.

Figure 34:
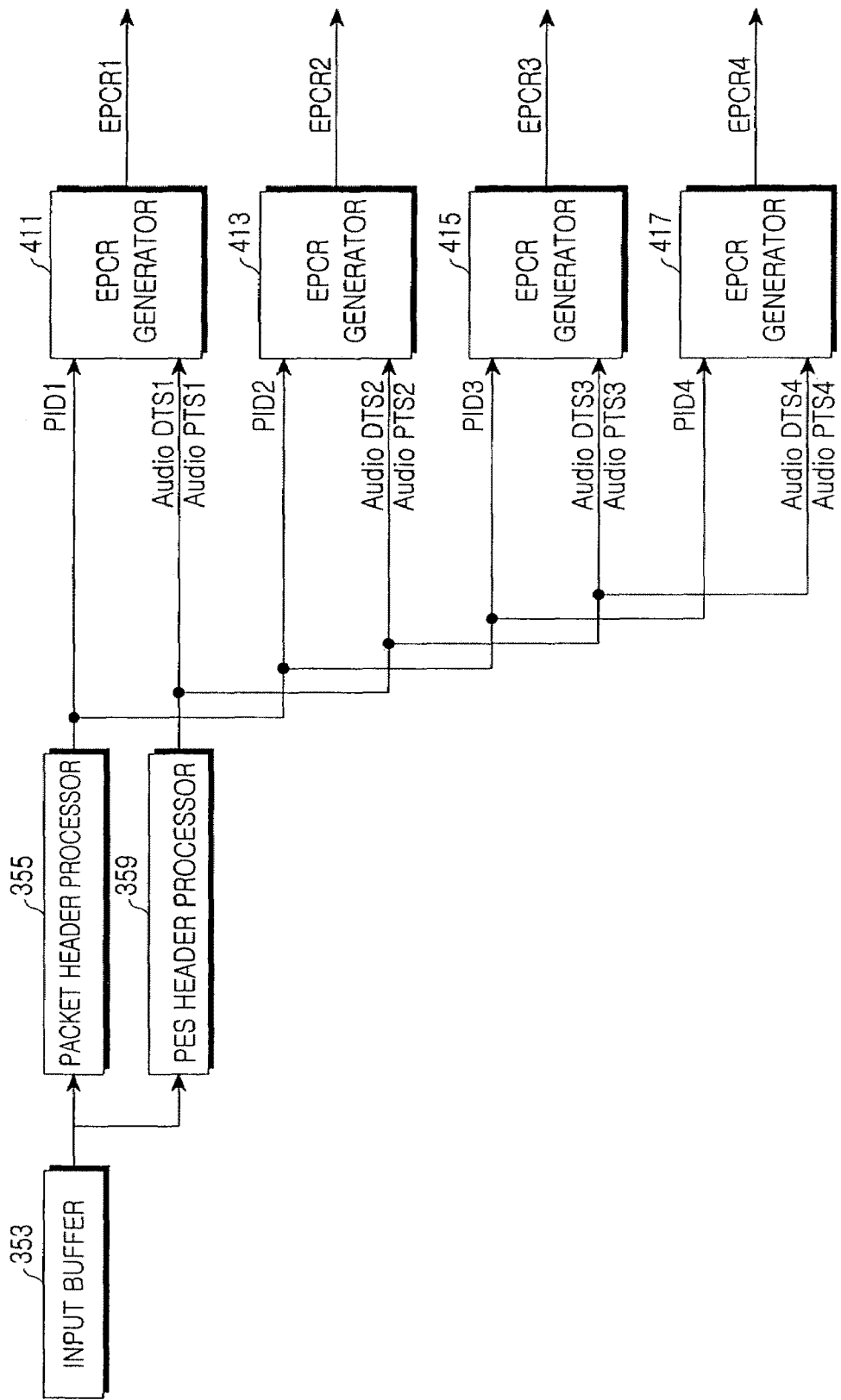
FIG. 34 is a block diagram illustrating a structure of generating a plurality of decoding timing control signals for controlling decoding timings of a plurality of channels, respectively, in a digital broadcast receiver servicing the plurality of channels, according to an exemplary embodiment of the present invention.

FIG. 34 illustrates a structure of extracting an ADTS or APTS of each selected channel to generate an EPCR when a plurality of channels are selected and reproduced in a portable terminal with a DVB receiver. FIG. 34 shows a structure capable of selecting 4 channels, and a plurality of broadcast channels are selected from one frequency channel in such a structure. That is, in a case of the DVB, a plurality of broadcast channels is serviced over one frequency channel. For example, the BBC broadcast center has 4 to 5 broadcast channels, and these broadcast channels time-dividedly propagate over one frequency channel. Thus, the DVB receiver can receive a plurality of broadcast channels by being tuned with one frequency channel. In this case, not only one decoder may be used, but also a plurality of decoders may be used for decoding received signals. Also, a plurality of EPCR generators (here, 4 EPCR generators) is provided.

Referring to FIG. 34, if data of packet size is buffered in the input buffer 353, the packet header processor 355 extracts a packet header from the packet data, and determines whether the packet header has a PID of a selected broadcast channel. If the PID of the selected broadcast channel is detected, the detected PID is delivered to the EPCR generator corresponding to the PID, from among the EPCR generator 411 to 417. Also, the PES header processor 359 extracts an ADTS or APTS of the selected channel, and applies the extracted ADTS or APTS to the corresponding EPCR generator. If the ADTS or APTS is inputted after the PID is inputted, the EPCR generators 411 to 417 generate an EPCR according to the ADTS or APTS. The so-generated EPCR is compared with a VDTS or VPTS signal for decoding video data of a corresponding channel, and a video decoding control signal is generated based on a result of the comparison.

Figure 35:
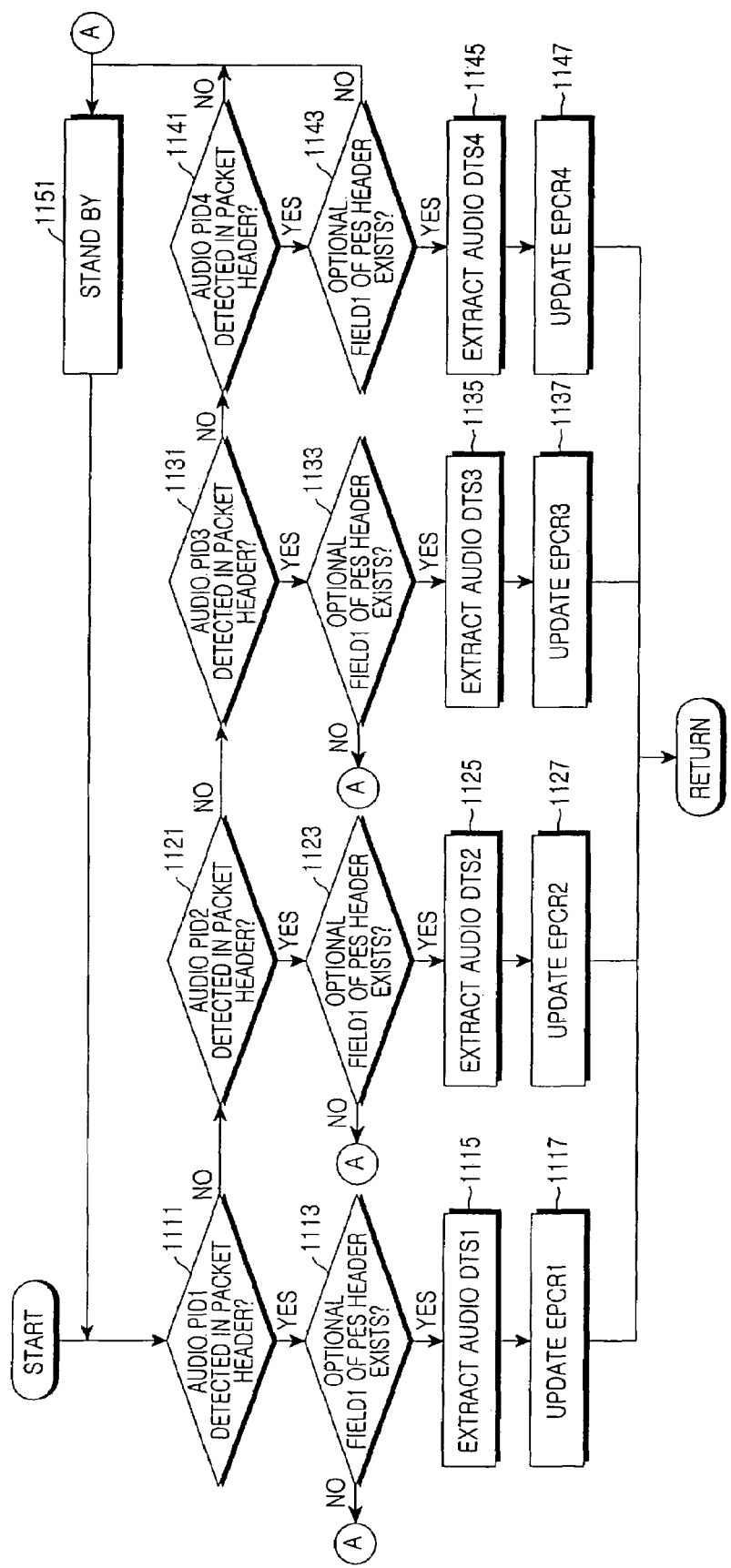
FIG. 35 is a flowchart illustrating a procedure of generating the plurality of decoding timing control signals in the structure as in FIG. 34.

FIG. 35 is a flowchart illustrating a procedure of generating an EPCR of a selected channel in the plurality of EPCR generators 411 to 417.

Referring to FIG. 35, first, the packet header processor 355 detects an audio PID of a selected channel in steps 1111, 1121, 1131 and 1141. At this time, if the audio PID of the selected channel is detected, the packet header processor 355 senses and delivers the detected PID to the PES header processor 359 and the corresponding EPCR generator. The PES header processor 359 then determines whether a PES header exists in the corresponding packet. If the PES header exists, the PES header processor 359 determines whether there is optional field 1 in which an ADTS or APTS exists in steps 1113, 1123, 1133, 1143. At this time, when no PES header exists or when the PES header exists but no optional field 1 exists, the PES header processor 359 stands by for a certain time in step 1151, and then repeatedly performs the above-mentioned operation for a next packet. However, if the optional field 1 exists, the PES header processor 359 extracts the ADTS or APTS from the optional field 1 to deliver the extracted ADTS or APTS to the corresponding EPCR generator in steps 1115, 1125, 1135 and 1145, and the EPCR generator updates a corresponding EPCR value according to the ADTS or APTS in steps 1117, 1127, 1137 and 1147.

In FIG. 35, steps 1111 to 1117 correspond to a process of updating an EPCR value of a first selected channel, steps 1121 to 1127 correspond to a process of updating an EPCR value of a second selected channel, steps 1131 to 1137 correspond to a process of updating an EPCR value of a third selected channel, and steps 1141 to 1147 correspond to a process of updating an EPCR value of a fourth selected channel.

EPCRs of a plurality of channels can be generated through such a procedure, and the generated EPCR values can be compared with a VDTS or VPTS to control a decoding time point of video data and/or a presentation time point of decoded video data according to the procedures described in the first to fourth embodiments of the present invention.

As describe above, according to the exemplary embodiments of the present invention, decoding time points of audio data and video data can be controlled using not clock information transmitted from a transmitting side, but a received time stamp. On account of this, a structure for clock synchronization on a receiving side can be simplified, and a decoding procedure on the receiving side can also be simply implemented. When the decoding time points of audio data and video data are controlled using the time stamp (DTS, PTS), whether time stamp information is received is determined. If the time stamp information is not received, an interpolated time stamp signal is generated. As a result, the decoding time points can be precisely controlled even if the time stamp is not extracted in every frame, and an input buffer or an output buffer is prevented from underflow or overflow.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. It is also envisioned that carrier waves (such as data transmission through the Internet via wired or wireless transmissions paths, for example) can be utilized as an equivalent to a computer readable medium. Also, function programs, codes, and code segments for accomplishing the present invention can be easily construed as within the scope of the invention by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and equivalents thereof.

What is claimed is:

1. A decoding device in a digital broadcast receiver, the device comprising:
    a demultiplexer unit for demultiplexing received packet data into video data and audio data, and extracting decoding control signals of respective audio and video data;
    a synchronization controller unit for generating an Estimated Program Clock Reference (EPCR) from the decoding control signal of the audio data, and comparing the EPCR with the decoding control signal of the video data to generate a video decoding control signal;
    a video decoder unit for decoding the demultiplexed video data in synchronous with the video decoding control signal, and then outputting the decoded video data;
    an audio decoder unit for decoding the demultiplexed audio data in synchronous with the audio decoding control signal, and then outputting the decoded audio data; and
    a display unit for displaying the decoded video data,
    wherein the synchronization controller unit comprises a Program Clock Reference (PCR) generator for updating a value of the audio decoding control signal inputted into a value of the EPCR and a comparator for comparing the video decoding control signal inputted with the EPCR to output the video decoding control signal at a point of time when the EPCR comprises a value greater than the value of the video decoding control signal, and
    wherein the comparator of the synchronization controller unit inputs a video DTS (VDTS) and a video PTS (VPTS) as the video decoding control signal, generates a video decoding start control signal at a point of time when the EPCR value becomes greater than the VDTS value, and generates a video decoding outputting control signal at a point of time when the EPCR value becomes greater than the VPTS value.

2. The device as claimed in claim 1, wherein the audio decoding control signal comprises an audio decoding start control signal, and the audio decoding start control signal comprises an audio Decoding Timing Stamp (DTS) (ADTS) for determining a decoding time point of audio data.

3. The device as claimed in claim 1, wherein the audio decoding control signal comprises an audio decoding outputting control signal, and the audio decoding outputting control signal comprises an audio Presentation Timing Stamp (PTS) (APTS) for determining a presentation time point of decoded audio data.

4. The device as claimed in claim 1, wherein the video decoder unit comprises:
    a video input buffer for storing the video data inputted;
    a video decoder for decoding the video data stored in the video input buffer by the video decoding control signal; and
    a video output buffer for buffering the decoded video data and outputting the decoded video data to the display unit.

5. The device as claimed in claim 1, wherein the video decoder unit comprises:
    a video input buffer for storing the video data inputted;
    a video decoder for decoding the video data stored in the input buffer when the video decoding control signal indicating video decoding start is generated; and
    a video output buffer for buffering the decoded video data, and outputting the decoded video data to the display unit when the video decoding control signal for outputting the decoded video data is generated.

6. The device as claimed in claim 1, wherein the synchronization controller unit further comprises
    an interpolator for updating a value of the video decoding control signal when the video decoding control signal is inputted from the demultiplexer unit, and interpolating the value of the video decoding control signal to generate an interpolated video decoding control signal, if the video decoding control signal does not exist in a video frame header detected by the demultiplexer unit.

7. The device as claimed in claim 6, wherein the video decoder unit comprises:
    a video input buffer for storing the video data inputted;
    a video decoder for decoding the video data stored in the video input buffer by the audio decoding control signal; and a video output buffer for buffering the decoded video data and outputting the decoded video data to the display unit.

8. The device as claimed in claim 6, wherein the video decoder unit comprises:
   a video input buffer for storing the video data inputted;
   a video decoder for decoding the video data stored in the video input buffer; and
   a video output buffer for buffering the decoded video data, and outputting the decoded video data to the display unit when the video decoding control signal is generated.

9. The device as claimed in claim 6, wherein the video decoder unit comprises:
   a video input buffer for storing the video data inputted;
   a video decoder for decoding the video data stored in the input buffer when the video decoding control signal indicating video decoding start is generated; and
   a video output buffer for buffering the decoded video data, and outputting the decoded video data to the display unit when the video decoding control signal for outputting the decoded video data is generated.

10. A decoding device in a digital broadcast receiver, the device comprising:
   a demultiplexer unit for demultiplexing packet data received from at least two channels into video data and audio data of corresponding channels, and extracting decoding control signals of the respective data of the corresponding channels, respectively;
   a synchronization controller unit for generating corresponding Estimated Program Clock References (EPCRs) from the decoding control signals of the audio data of the respective channels, and comparing the EPCRs with the corresponding decoding control signals of the video data of the respective channels to generate video decoding control signals;
   video decoder units for decoding the demultiplexed video data of the respective channels in synchronous with the corresponding video decoding control signals of the respective channels, and then outputting the decoded video data;
   audio decoder units for decoding the demultiplexed audio data of the respective channels in synchronous with the corresponding audio decoding control signals of the respective channels, and then outputting the decoded audio data; and
   a display unit for displaying the decoded video data,
   wherein the synchronization controller unit comprises a Program Clock Reference (PCR) generator for updating a value of the audio decoding control signal inputted into a value of the EPCR and a comparator for comparing the video decoding control signal inputted with the EPCR to output the video decoding control signal at a point of time when the EPCR comprises a value greater than the value of the video decoding control signal, and
   wherein the comparator of the synchronization controller unit inputs a video DTS (VDTS) and a video PTS (VPTS) as the video decoding control signal, generates a video decoding start control signal at a point of time when the EPCR value becomes greater than the VDTS value, and generates a video decoding outputting control signal at a point of time when the EPCR value becomes greater than the VPTS value.

* * * * *

UNITED STATES PATENT AND TRADEMARK OFFICE
CERTIFICATE OF CORRECTION

| | | |
|---|---|---|
| PATENT NO. | : 7,656,947 B2 | Page 1 of 1 |
| APPLICATION NO. | : 11/545558 | |
| DATED | : February 2, 2010 | |
| INVENTOR(S) | : Seo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this

Twenty-eighth Day of December, 2010

David J. Kappos
*Director of the United States Patent and Trademark Office*